United States Patent
Taneja et al.

(10) Patent No.: US 7,687,928 B2
(45) Date of Patent: Mar. 30, 2010

(54) DUAL-STRUCTURED AIRCRAFT ENGINE STARTER/GENERATOR

(75) Inventors: Dinesh N. Taneja, Vandalia, OH (US); Hao Huang, Troy, OH (US); Gary A. Padgett, Kettering, OH (US); Jan Zywot, Centerville, OH (US); Paul J. Wirsch, Jr., Springboro, OH (US); Mohamed A. Abbas, Huber Heights, OH (US)

(73) Assignee: Smiths Aerospace, LLC, Grand Rapids, MI (US)

( * ) Notice: Subject to any disclaimer, the term of this patent is extended or adjusted under 35 U.S.C. 154(b) by 154 days.

(21) Appl. No.: 11/797,451

(22) Filed: May 3, 2007

(65) Prior Publication Data

US 2008/0093850 A1 Apr. 24, 2008

Related U.S. Application Data

(60) Provisional application No. 60/813,373, filed on Jun. 14, 2006.

(51) Int. Cl.
H02P 9/00 (2006.01)
H02P 9/02 (2006.01)
F02N 11/04 (2006.01)

(52) U.S. Cl. .......................... 290/36 R; 290/31; 322/44; 322/59; 322/89

(58) Field of Classification Search ............... 290/38 R, 290/8, 31, 36 R, 4 A, 34; 322/44, 59, 89, 322/90

See application file for complete search history.

(56) References Cited

U.S. PATENT DOCUMENTS 4,177,389 A * 12/1979 Schott .......................... 307/64

| | | | | |
|---|---|---|---|---|
| 4,684,873 A | * | 8/1987 | Glennon .......................... | 322/47 |
| 4,743,777 A | | 5/1988 | Shilling et al. | |
| 4,947,100 A | * | 8/1990 | Dhyanchand et al. ......... | 322/10 |
| 4,967,096 A | * | 10/1990 | Diemer et al. ................. | 307/19 |
| 5,013,929 A | * | 5/1991 | Dhyanchand ................. | 290/31 |
| 5,015,941 A | * | 5/1991 | Dhyanchand ................. | 322/10 |
| 5,387,859 A | * | 2/1995 | Murugan et al. .............. | 322/10 |

(Continued)

OTHER PUBLICATIONS

U.S. Appl. No. 11/452,236, filed Jun. 14, 2006, Huang et al.

*Primary Examiner*—Julio Cesar Gonzalez
(74) *Attorney, Agent, or Firm*—William Scott Andes, Esq.; Armstrong Teasdale LLP

(57) ABSTRACT

An aircraft starting and generating system includes a first starter/main machine assembly that includes a first exciter and a first main machine, and second starter/main machine assembly that includes a second exciter and a second main machine. The system also includes a permanent magnet generator (PMG) that is connected to the first and second starter/main machine assemblies. The system further includes a first inverter/converter/controller (ICC) that is connected to the first starter/main machine assembly and to the PMG, and a second ICC that is connected to the second starter/main machine assembly and to the PMG. The first and second ICCs generate AC power to respective drive the first and second starter/main machine assemblies in a start mode of the starting and generating system for starting a prime mover of the aircraft, and the first and second ICCs convert AC power, respectively obtained from the PMG after the prime mover has been started, to DC power in a generate mode of the starting and generating system.

18 Claims, 21 Drawing Sheets

U.S. PATENT DOCUMENTS

| | | |
|---|---|---|
| 5,587,647 A | 12/1996 | Bansal et al. |
| 5,929,537 A * | 7/1999 | Glennon ..................... 307/46 |
| 6,351,090 B1 * | 2/2002 | Boyer et al. ................ 318/139 |
| 7,227,271 B2 * | 6/2007 | Anghel et al. ................. 290/31 |
| 2006/0038405 A1 * | 2/2006 | Xu et al. ...................... 290/31 |
| 2006/0087123 A1 * | 4/2006 | Stout et al. .................... 290/2 |

* cited by examiner

DUAL-STRUCTURED AIRCRAFT ENGINE STARTER/GENERATOR

RELATED APPLICATIONS

This application claims priority to U.S. Provisional Patent Application Ser. No. 60/813,373, entitled 'Aircraft Engine Starter/Generator', filed on Jun. 14, 2006, the contents of which are incorporated in their entirety herein by reference. This application is related to U.S. patent application Ser. No. 11/452,236, filed on Jun. 14, 2006, entitled 'Aircraft Engine Starter/Generator', the contents of which are incorporated in their entirety herein by reference.

FIELD OF THE INVENTION

The invention relates generally to an aircraft engine starter/generator, and more particularly to an aircraft engine starter/generator that is has a parallel, dual structure for starting an aircraft engine and for generating electric power for the aircraft after the engine has been started.

DESCRIPTION OF THE RELATED ART

There currently exist starter generator systems for aircraft, which are used to both start an aircraft engine, and to utilize the aircraft engine after it has started in a generate mode, to thereby provide electrical energy to power systems on the aircraft. For example, U.S. Pat. No. 4,743,777, issued to William Shilling et al., describes a starter generator system with two stator exciter windings, and which includes a variable voltage, variable frequency power converter that is alternately connected to drive an dynamoelectric machine as a starting motor or to receive power from the machine during generator operation. U.S. Pat. No. 5,587,647, issued to Madan Bansal et al., describes a dual output, synchronous-induction starting/generating system. The Bansal system includes a synchronous generator and an induction motor/generator mutually coupled to a shaft that is driven to an external prime mover, such as an aircraft engine. The Bansal system also includes a rectifier/inverter that allows bi-directional power flow to effectuate both power generation as well as electric start of the aircraft engine.

While the prior art systems described above are useful in starting an aircraft engine and in generating power from the aircraft engine once the engine has started, it is desirable to come up with a system that has better perform in either or both of a start mode and a generate mode.

SUMMARY OF THE INVENTION

According to at least one aspect of the invention, there is an aircraft engine starter/generator system. The aircraft starting and generating system includes a first starter/main machine assembly that includes a first exciter and a first main machine, and second starter/main machine assembly that includes a second exciter and a second main machine. The system also includes a permanent magnet generator (PMG) that is connected to the first and second starter/main machine assemblies. The system further includes a first inverter/converter/controller (ICC) that is connected to the first starter/main machine assembly and to the PMG, and a second ICC that is connected to the second starter/main machine assembly and to the PMG. The first and second ICCs generate AC power to respective drive the first and second starter/main machine assemblies in a start mode of the starting and generating system for starting a prime mover of the aircraft, and the first and second ICCs convert AC power, respectively obtained from the main machine after the prime mover has been started, to DC power in a generate mode of the starting and generating system.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The present invention will be described in detail below, with reference to the accompanying drawings. The present invention relates to an energy conversion, electric rotating device that converts electrical energy to mechanical energy in start mode and mechanical energy to electrical energy in generate mode.

Figure 1:
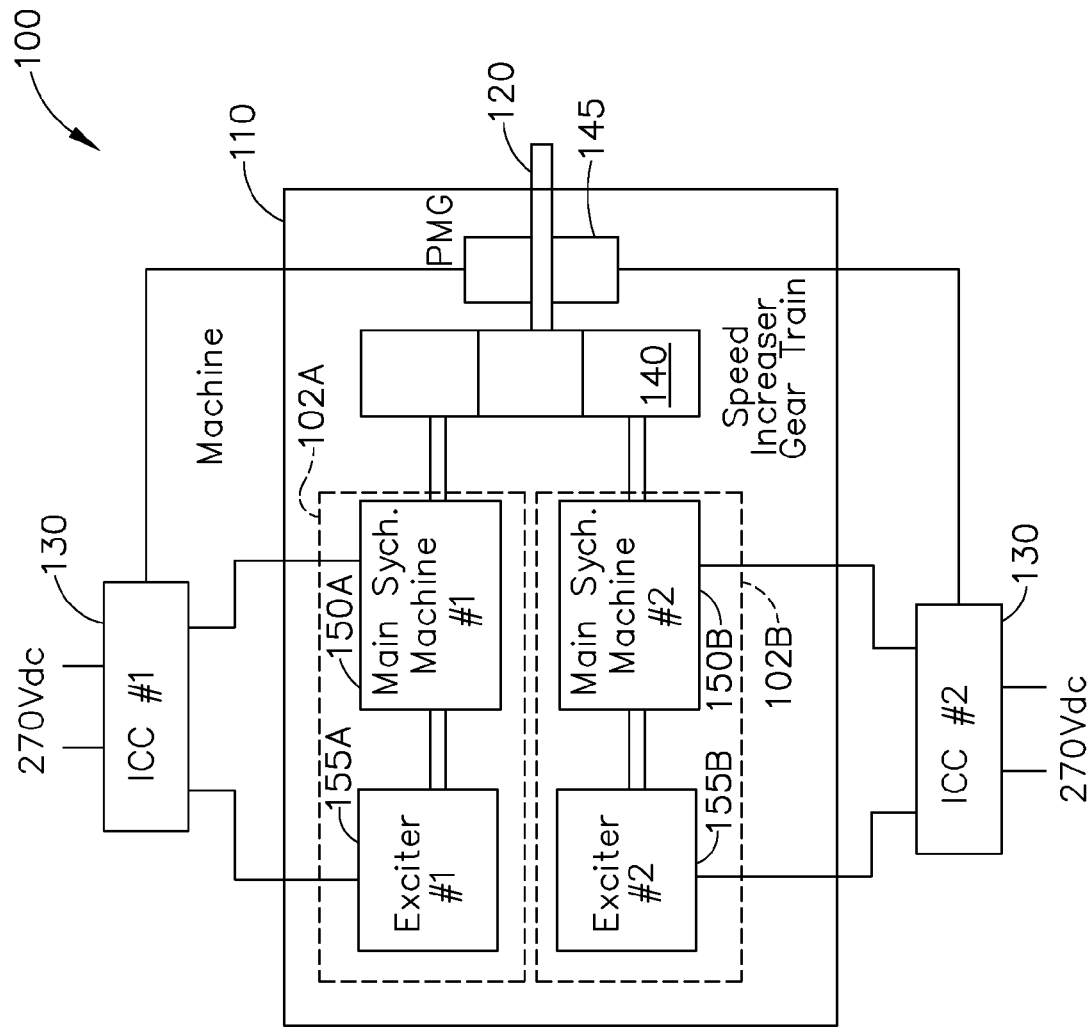
FIG. 1 is a block diagram of the overall ES/G system according to a first embodiment of the invention.

The first embodiment of the present invention will be described next, with respect to overall construction of an aircraft engine starting and power generating system (ES/G System). The ES/G System 100 is shown in FIG. 1, and includes the following three units, which may be configured as Line Replacement Units (LRUs) in one possible implementation of the first embodiment:

a. Engine Starter/Generator Assembly 110—Quantity one (1) per system b. Stub Shaft 120—Quantity one (1) per system c. Inverter Converter Controller (ICC) 130—Quantity two (2) per system The ES/G assembly 110 according to the first embodiment is mounted on an engine gearbox, such as by way of a Quick Attach Detach (QAD) band clamp, and is coupled to the engine gearbox via a stub shaft. The ES/G assembly 110 is preferably an oil-cooled and lubricated assembly. The ES/G assembly 110 includes a speed increaser gear train 140 and a permanent magnet generator (PMG) 145 at the input stage. The speed increaser gear train 140 has two (2) parallel shaft outputs 147A, 147B, which couple two (2) identical synchronous-wound machines; by way of example, two 80 kW synchronous wound machines (referred to herein as first and second Starter/Generators 102A, 102B). Each of the two identical 80 kW Starter/Generators includes two (2) sections—a main synchronous-wound machine 150A, 150B and an exciter section 155A, 155B, as shown in FIG. 1.

Each Inverter/Converter Controller (ICC) 130 may be configured as a Line Replaceable Unit (LRU), whereby each LRU may be constructed as a fuel-cooled, 100% solid-state assembly. The two ICCs 130 are identical to each other in structure and in operation, and are connected to each of the two machines inside the integrated ES/G assembly 110 by power and control cables via connectors. Each of the two ICCs 130 is connected to receive power from an internal aircraft power source, shown as a 270 Vdc power source, as shown in FIG. 1.

Figure 2:
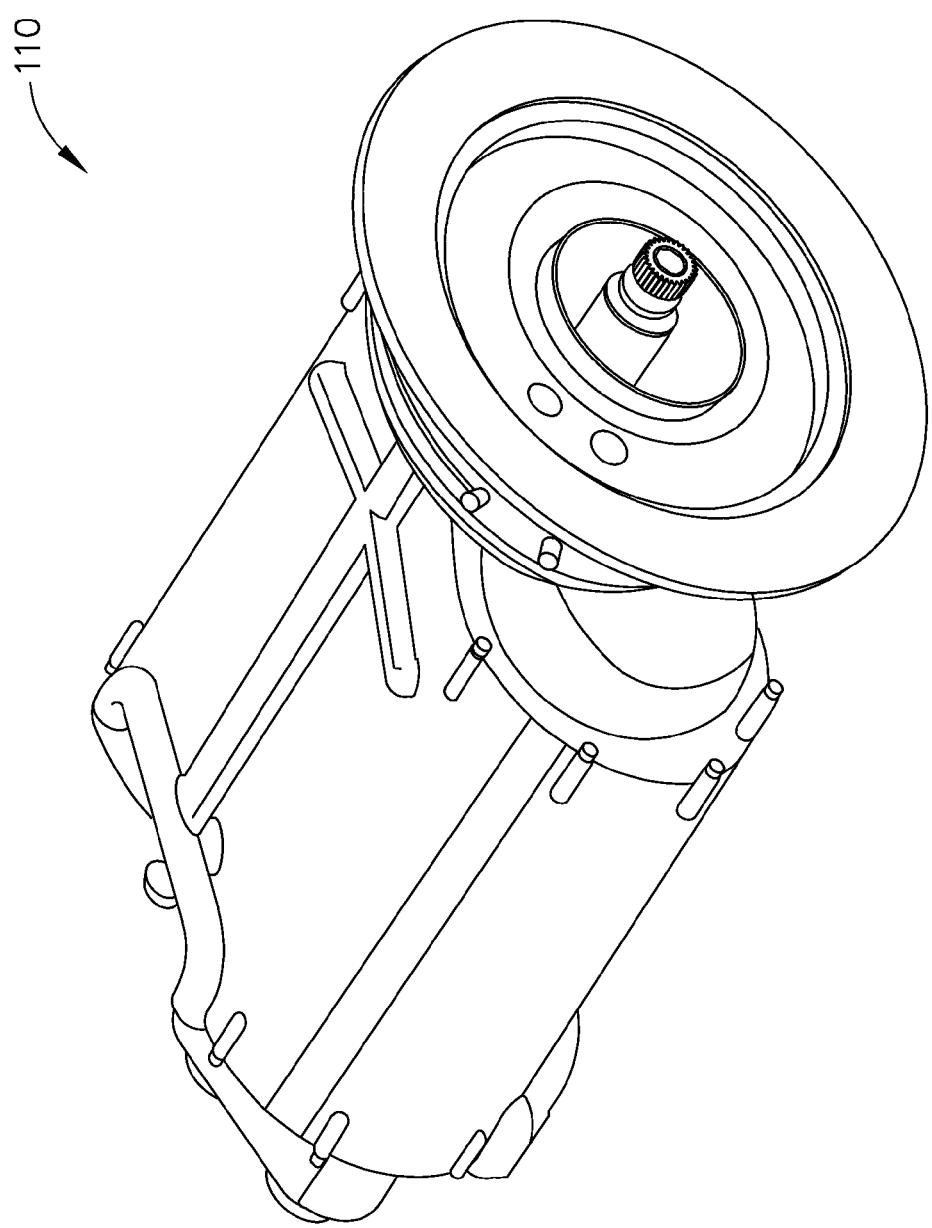
FIG. 2 is an isometric view of an ES/G assembly according to the first embodiment of the invention.
Figure 3:
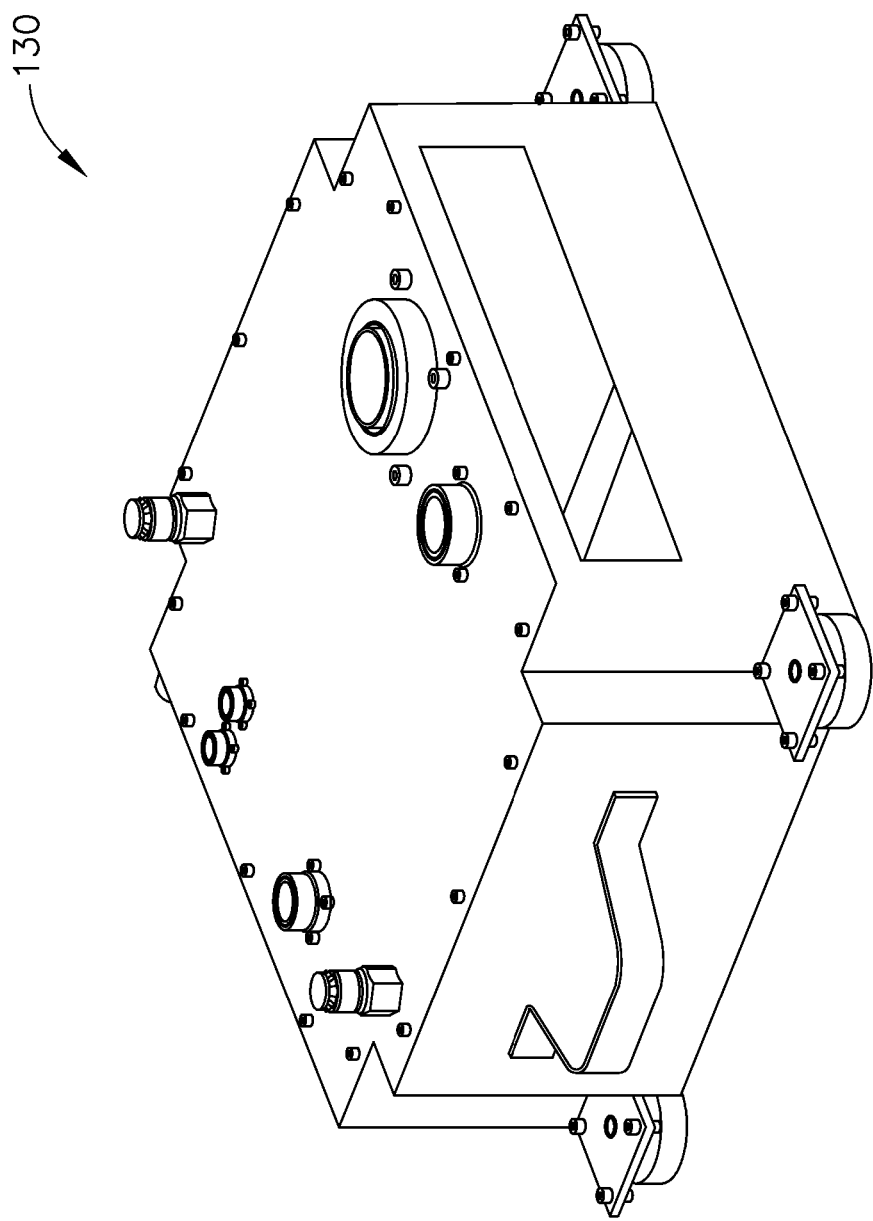
FIG. 3 is an isometric view of an ICC unit according to the first embodiment of the invention.
Figure 4:
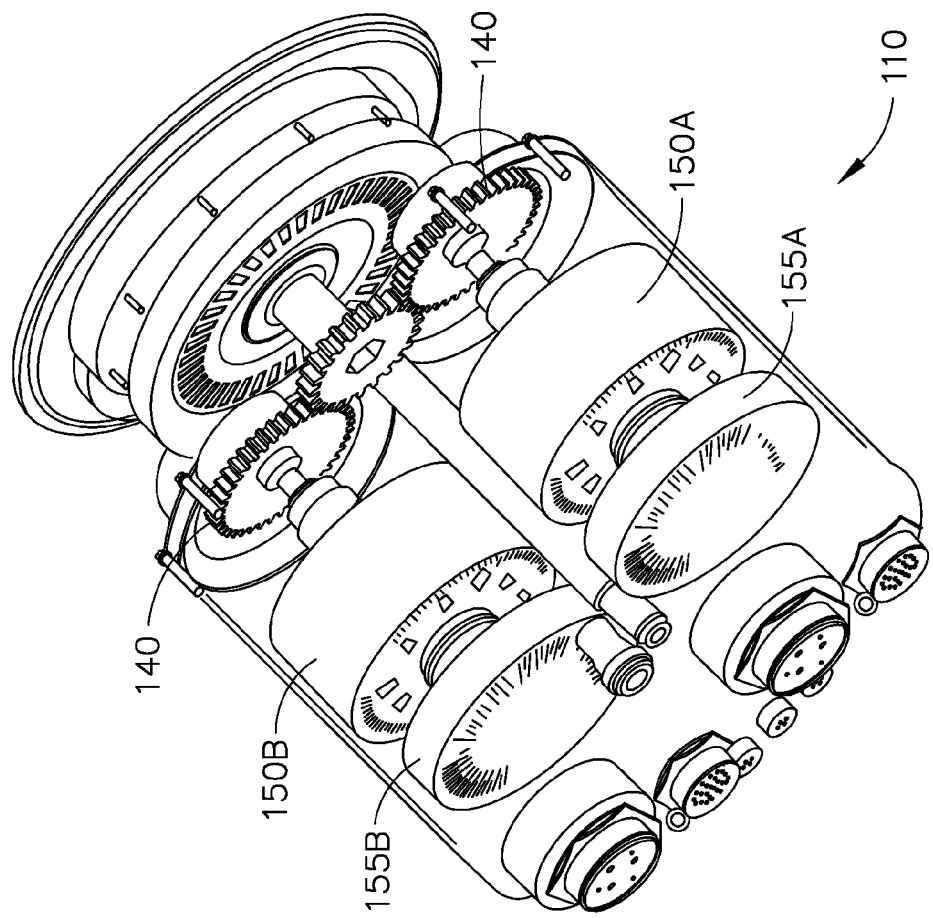
FIG. 4 is a see-through view of an ES/G assembly according to the first embodiment of the invention.

An isometric view of the ES/G LRU and the ICC LRUs is illustrated in FIG. 2 and FIG. 3, respectively. A 3-D see-through view of the ES/G assembly 110 with integral PMG and speed increaser gear train and the two identical 80 kW machines is illustrated in FIG. 4.

A basic system operation of the ES/G system 100 according to the first embodiment will be described in detail hereinbelow. During the generate mode, the input stub shaft 120 coupled to the engine gearbox drives the speed increaser gear train 140 and the rotor of the PMG 145. The stator of the PMG 145 contains a plurality of mutually isolated windings. In one possible implementation, the PMG stator contains five (5) windings, whereby other number of windings may be used while remaining within the spirit and scope of the invention. In the five-winding implementation, three (3) of the windings are used for the Converter-Regulators, whereby the fourth and fifth windings are used for the ICC power supply and excitation of the ES/G exciter, respectively, if the output of the ES/G Assembly 110 is shorted in the generate mode.

Figure 5:
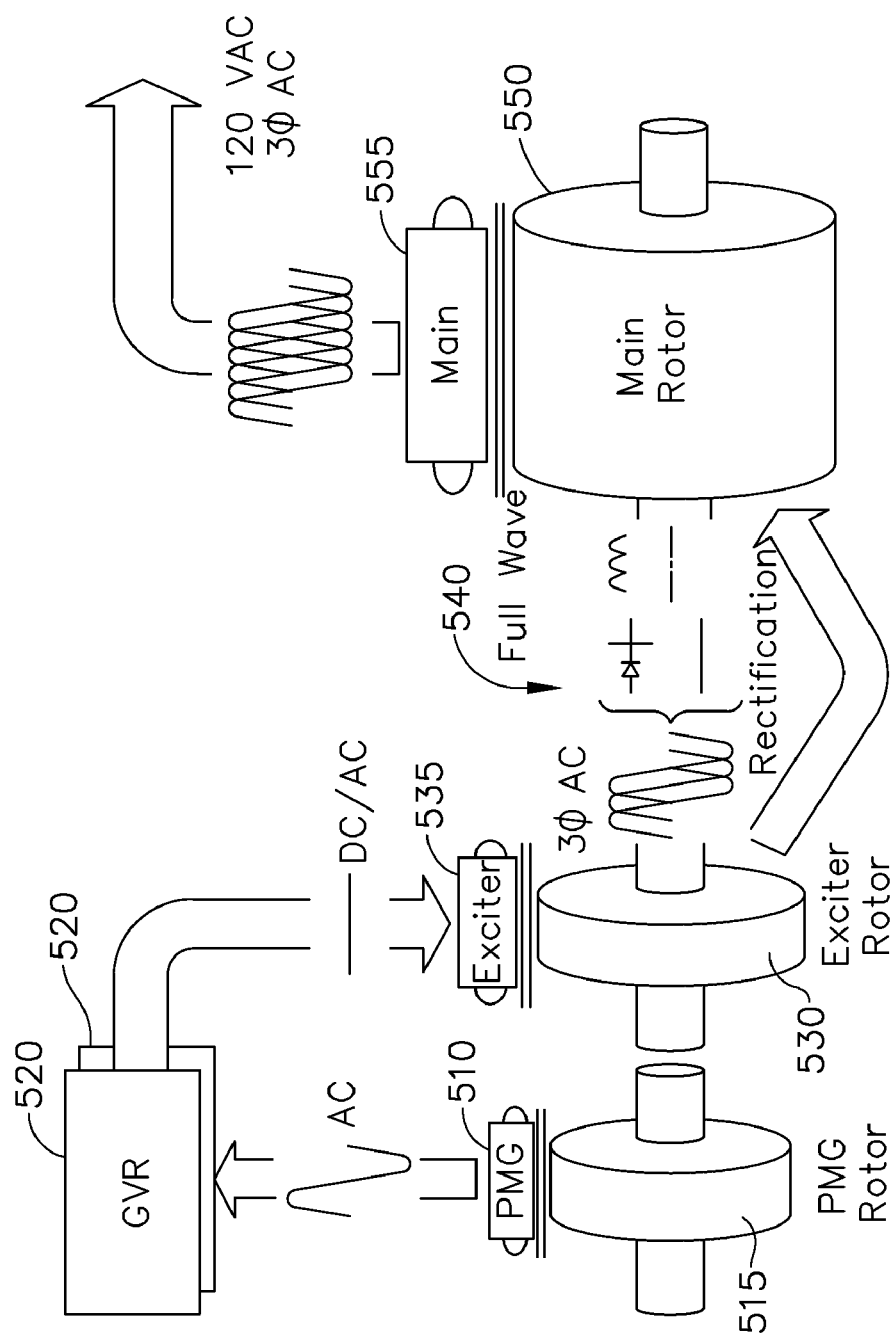
FIG. 5 is an electrical diagram of an ES/G in generate mode, according to the first embodiment of the invention.

The speed increaser gear train 140 splits and steps up input mechanical power into two parallel paths for the two identical machines. Each of the two machines has an exciter 155A, 1558 and main generator section 150A, 1508, as shown in FIG. 1. An electrical diagram of a single generator with a common PMG is illustrated in FIG. 5, which shows a three-core synchronous implementation. The PMG 145 includes a PMG stator 510 and a PMG rotor 515.

The PMG stator 510 supplies electrical power to generator voltage regulator (GVR) assemblies located inside each ICC 130. AC voltage is induced in the stator windings by rotating permanent magnets of the PMG 145. The GVR circuitry rectifies and modulates the output of the PMG 145. This is fed back to the exciter field winding, generating an AC voltage on the exciter rotor 530, which causes current flow. The exciter 155A, 155B is a brushless, synchronous machine with a stator and a three-phase wound rotor 530. The exciter stator 535 has a three-phase winding during start mode and a DC winding during generate mode. The magnitude of the exciter's AC voltage output is proportional to the DC excitation current on its stator and the rotor's rotational speed. The operation of an ES/G having such an exciter stator is described in detail in U.S. Provisional Patent Application 60/785,363, which is incorporated in its entirety herein by reference.

The exciter rotor's AC output is rectified with a full wave bridge of a plurality of diode rectifiers 540, mounted axially inside the rotor's shaft for direct contact oil cooling and low inertial forces. In one possible implementation, six (6) diode rectifiers are used, while other number of diode rectifiers may be contemplated. The DC output from the rectifiers 540 supplies field current to the main generator.

The main generator 150A, 150B includes a wound multiple-pole (e.g., 10-pole) rotor 550 and a star-connected 3Ø stator 555. The magnitude of the main stator's voltage output is proportional to the DC current supplied by the exciter rotor 535 (rectified by the diodes of the rectifier) and the rotor's rotational speed. The DC excitation voltage supplied to the exciter stator 535 determines the magnitude of the output power from the main generator 150A, 150B.

The output of the stator section 555 of the main generator 150A, 150B is fed into the respective ICC 130. The ICC 130 has a full-wave diode rectifier bridge and parallel-connected IGBTs (see FIG. 6). During continuous power generating modes, the diode bridge rectifies the generator's AC output (120 Vac) into 270 Vdc. A parallel-connected filter section removes ripple in the output voltage. Active power switching of the IGBTs is performed during sudden load application and removal conditions to achieve the desired voltage regulation.

Figure 6:
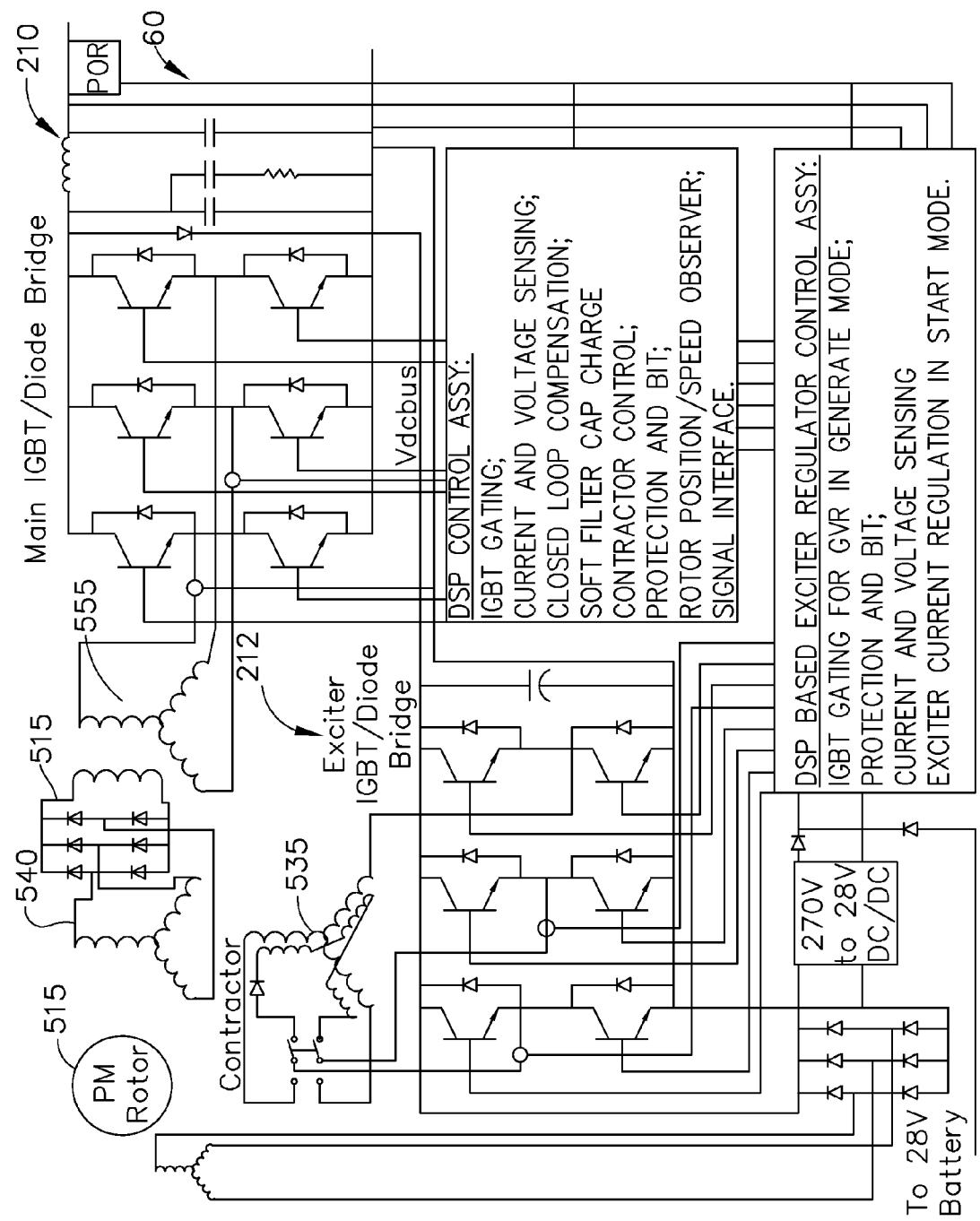
FIG. 6 is a block diagram of an S/G and ICC engine starting and power generating system that may be utilized in the ES/G according to the first embodiment, whereby only one S/G path is shown.

An electrical schematic of an ES/G system having a single main machine that may be modified to have a dual-structured aircraft engine starter/generator as described herein, is described below, with reference to FIG. 6. The ICC 130 shown in FIG. 6 includes two IGBT/Diode bridges: a main bridge 210 and an exciter bridge 212. The main bridge 210 and the exciter bridge 212 are also referred to as a main inverter/converter and an exciter inverter/converter, respectively. Each is controlled by a digital control assembly. The assembly that controls the main IGBT/Diode bridge 210 is called the main digital control assembly 230. Alternatively, it is also called the starter inverter digital control assembly in start mode and it is called the generator converter control assembly in generate mode. The assembly that controls the exciter IGBT/Diode bridge 212 is called the exciter digital control assembly 240. Alternatively, it is also called the exciter inverter digital control assembly in start mode and the exciter converter digital control assembly in generate mode. The main digital control assembly 230, along with its embedded software, controls the main bridge 210 that generates AC power to drive the S/G in start mode and converts the AC power to the DC power requested by the aircraft in generate mode. This highly integrated approach results in a lightweight, simple and reliable system, as compared to conventional S/G systems.

The S/G in each of the two dual paths of the E/G Assembly 110 is a combination of three electric machines, which are a main machine 150A, 150B, an exciter 155A, 155B, and a PMG 145 (only one PMG is utilized, which is shared by the two paths). This arrangement is called a three machine set. The main machine 150A, 150B may be a salient synchronous machine in one possible implementation of the first embodiment. The stator 555 of the main machine 150A, 150B connects to the main IGBT/Diode bridge 210 of the ICC 130. The rotor 550 of the main machine 150A, 150B connects to the output of a full wave or half wave rotating rectifier 540 located inside the shaft of the main rotor 550. The exciter rotor 530 has a three-phase winding that connects to the input of the rotating rectifier 540, and the exciter stator 535 includes a DC winding and a three-phase AC winding that connects to an exciter IGBT/Diode bridge 212 of the ICC 130 through a contactor 220 that is shown in FIG. 6.

The S/G system 100 has two operating modes: start mode and generate mode. In start mode, the S/G system 100 is powered from a separate power source, VDC 60, whereby the connection to the separate power source VDC 60 is shown in FIG. 6. Each main machine 150A, 150B works as a three-phase wound field salient synchronous motor in start mode. Two things have to happen in order to produce torque at the shaft of the synchronous motor. The first is to input three-phase alternating currents to the three-phase winding of the main stator 555, and the second is to provide excitation current to the main rotor 550. The frequency of the currents to the main stator 555 are provided so as to be proportional to the speed of the main machine. The three phase alternating currents are provided by the main IGBT/Diode bridge 210. The rotating field generated by the three-phase current interacts with the magnetic field generated by the main rotor 550, thus creating the mechanical torque at the shaft of the main rotor 550.

During start mode, 270 Vdc input power from either a ground power cart or the Integrated Power Package is applied to each of the two (2) ICCs 130. Each ICC 130 converts the input DC power into three-phase AC power of varying frequency, which is then applied to both ES/G main stators. The separate inverter that contains the GVR in generate mode now feeds the exciter of each ES/G, delivering DC exciting current to the main rotor field while operating in reverse field induction generator mode.

The power inverter within the ICC 130 switches power to the Starter/Generator main windings in a manner such that torque production within the main machine is unidirectional. The power switching action is controlled by a Digital Signal Processor which determines the proper sequence and instant, based on the machine rotor's instantaneous angular position. Each ES/G machine and ICC is operated essentially in a brushless DC motor mode to start the engine. The torque outputs from the two channels are summed by the speed increaser gears of the speed increaser gear train 140 of the ES/G Assembly 110 prior to transmittal to the engine gearbox (via the stub shaft 120).

As explained above, the three (3) LRUs comprising the ES/G System 100 are: Stub Shaft 120, ES/G Assembly 110, and ICC 130 (one ICC per LRU in a first implementation, and both ICCs housed in one LRU in a second implementation). Design and construction descriptions of these three LRUs is provided hereinbelow.

The stub shaft 120 provides a torque limiting shear area. One possible value for shear section torque is 500 ft-lb.

Figure 7:
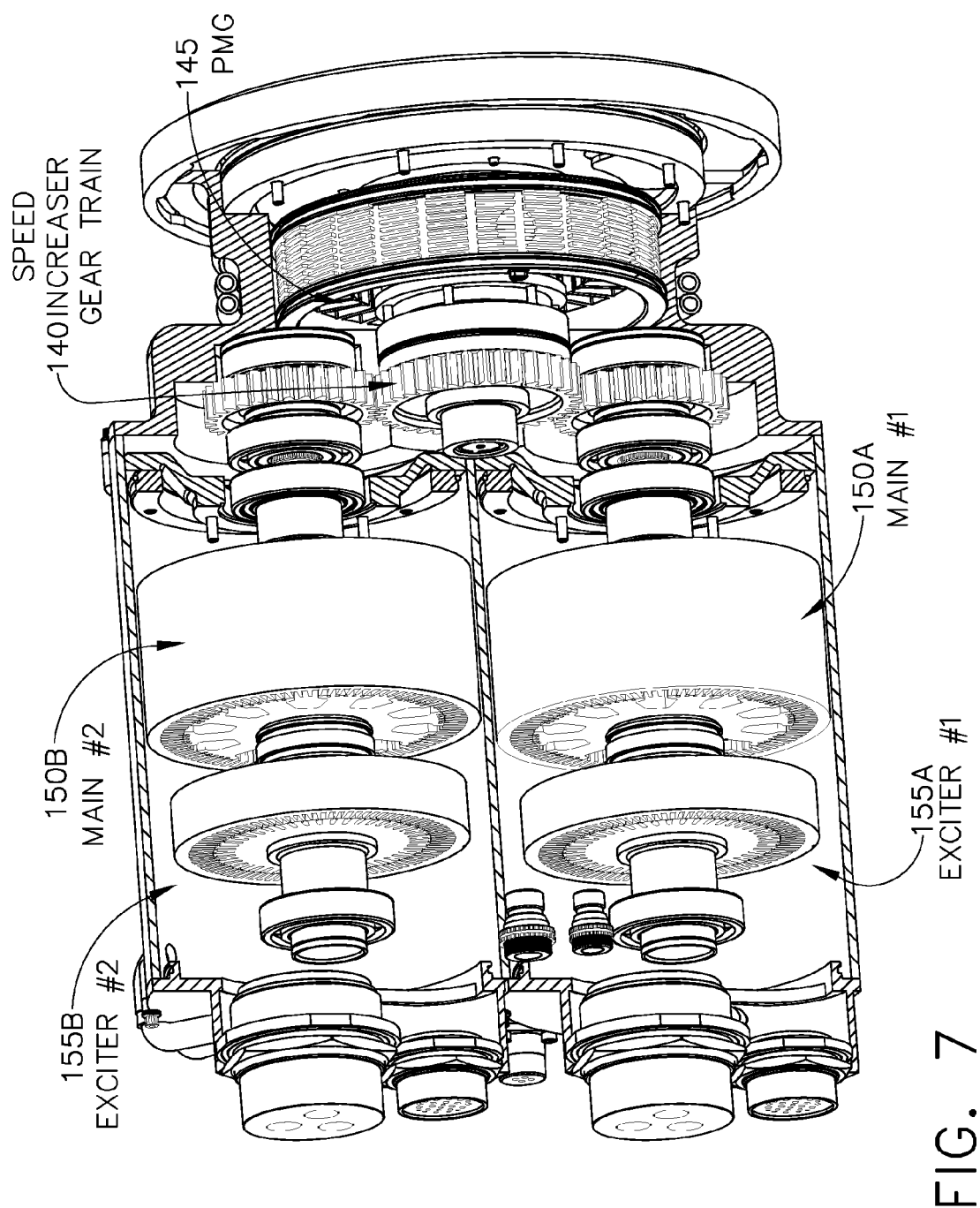
FIG. 7 shows outline dimensions of the ES/G assembly primary elements according to the first embodiment of the invention.

The ES/G Assembly 110 is an oil-cooled assembly to be mounted and coupled to the engine's gearbox, such as by a QAD band clamp. The ES/G Assembly 110 includes two (2) identical parallel Mounted Starter/Generators (S/G) 102A, 102B (comprising elements 150A, 150B, 155A, 155B), a speed increaser (S.I.) gear train 140, and a permanent magnet generator (PMG) 145 mounted inside a common housing. Outline dimensions of the ES/G Assembly 110 are illustrated in FIG. 7, and shows a mounting section and scavenge outlets.

The oil system provided for the ES/G system 100 according to the first embodiment will be described in detail hereinbelow. The engine gearbox oil is supplied at a high temperature, e.g., 221° F. temperature, and is used for both cooling and lubrication of the two Starter/Generators, the speed increaser gear train 140 and the PMG 145. The ES/G Assembly 110 receives 15 gpm of cooling oil from the oil reservoir. The flow of an amount, e.g., 8 gpm, of this oil is used for cooling and lubricating both Starter/Generators (4 gpm each). From that flow, a certain amount, e.g., 7 gpm, is returned to the oil reservoir through the oil return line and 1 gpm is used for lubrication of bearings and splines, which then is returned to the oil reservoir through the scavenge line. The remaining 7 gpm of flow is used for lubrication of gears and bearings of the speed increaser and cooling and lubrication of the PMG 145 (rotor, stator, and bearings). That oil is returned to the oil reservoir through the scavenge line. Two more scavenge lines are used for scavenging both Starter/Generators.

The interface between the ES/G Assembly 110 and the engine gearbox pad is maintained as a dry cavity. In addition to the oil, the engine gearbox-supplied air is used for the ES/G Assembly 110.

Figure 8:
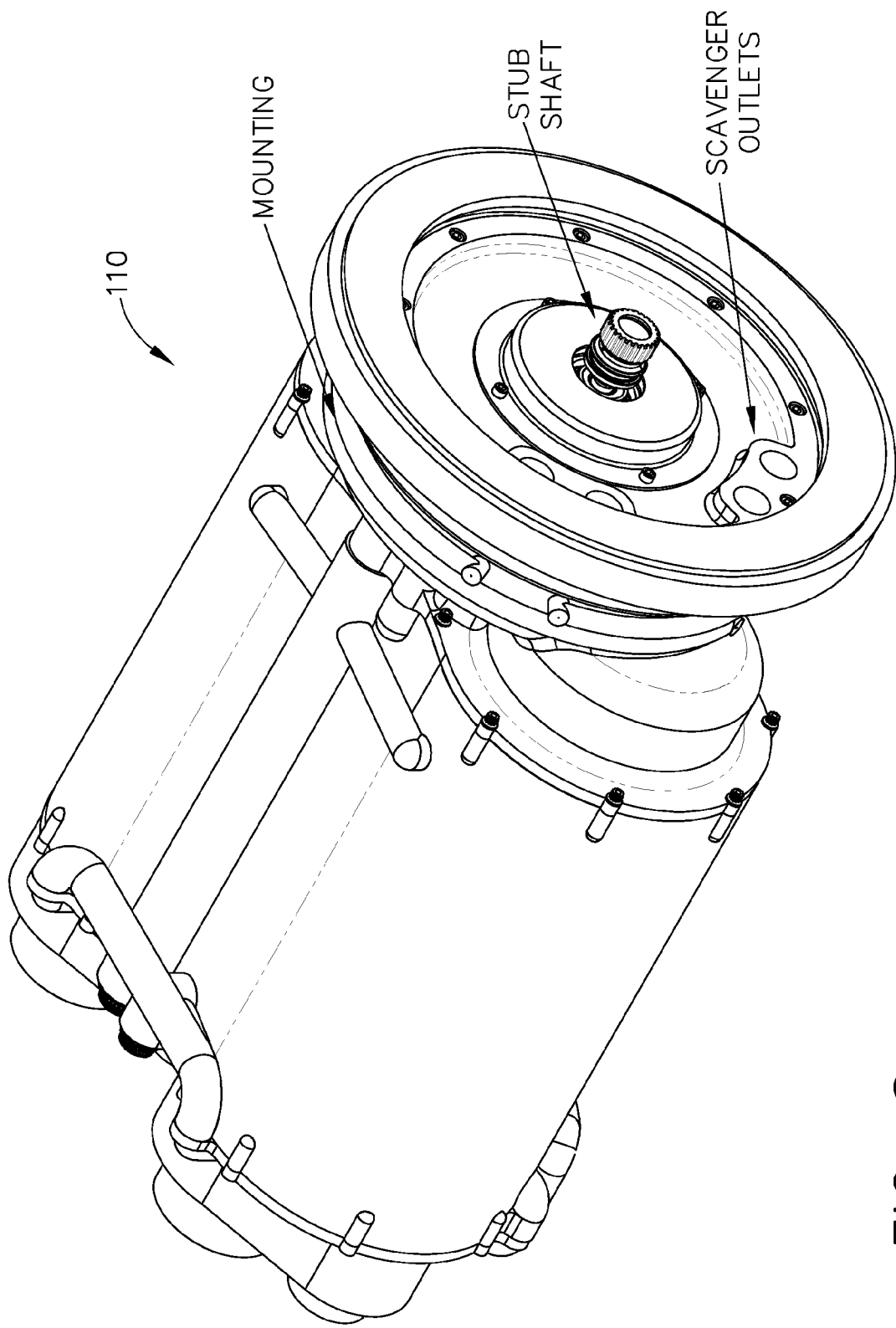
FIGS. 8 and 9 respectively show first and second end views of ES/G mechanical and electrical interfaces, according to the first embodiment of the invention.
Figure 9:
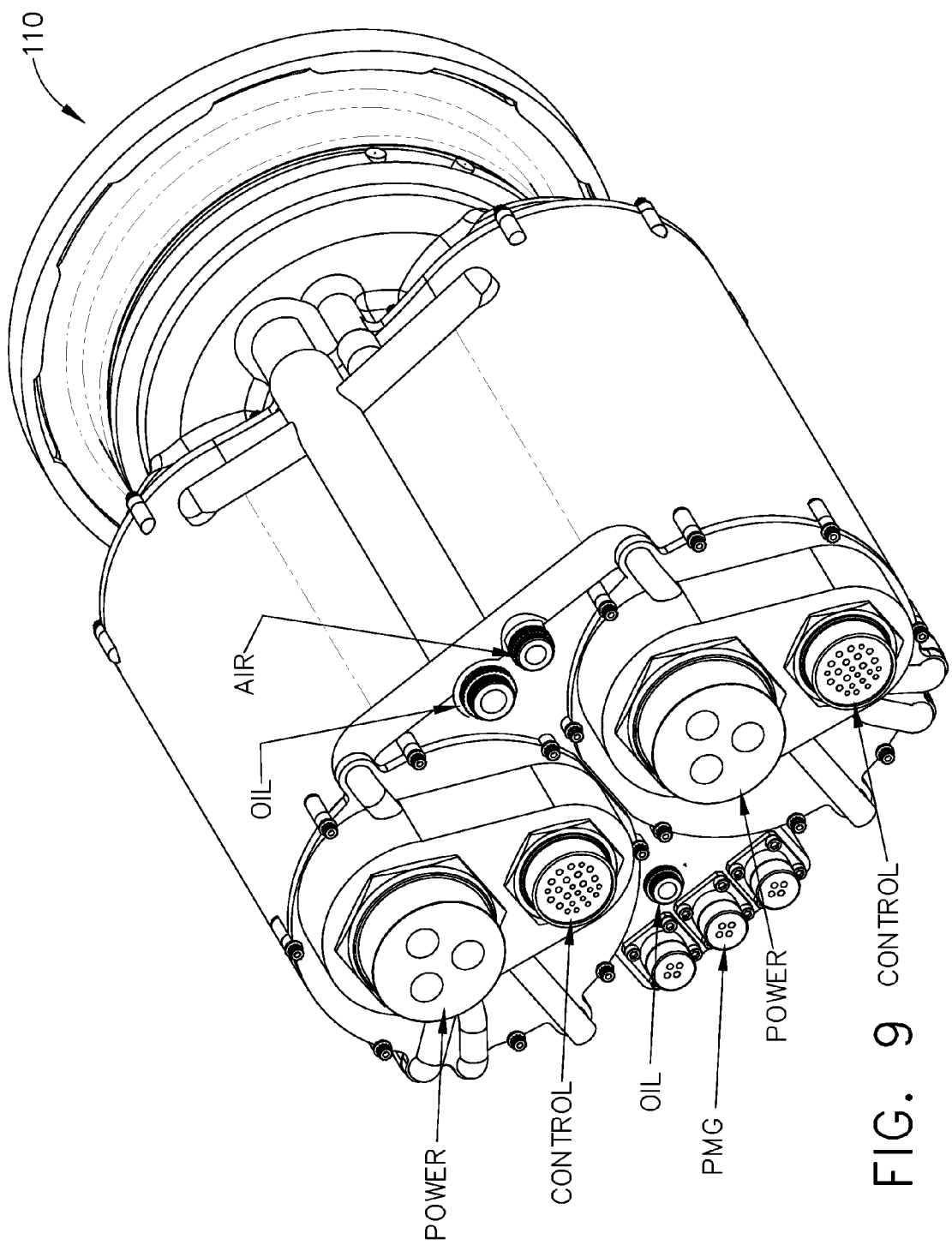

The ES/G Assembly 110 mechanical interfaces according to one possible implementation of the first embodiment include: a) Stub shaft with spline; b) Engine gearbox mounting flange; c) Oil inlet port—¾" Lourdes/Rosan fitting; d) Oil outlet port—⅝" Lourdes/Rosan fitting; e) Four (4) scavenge lines; and f) Air inlet port—½" Lourdes/Rosan fitting. FIG. 8 and FIG. 9 show ES/G Mechanical and Electrical Interfaces for both ends of the ES/G Assembly 110. Those interfaces include: stub shaft interface, scavenge outlets, oil interface, air interface, power interface, control interface and PMG interface.

Figure 10:
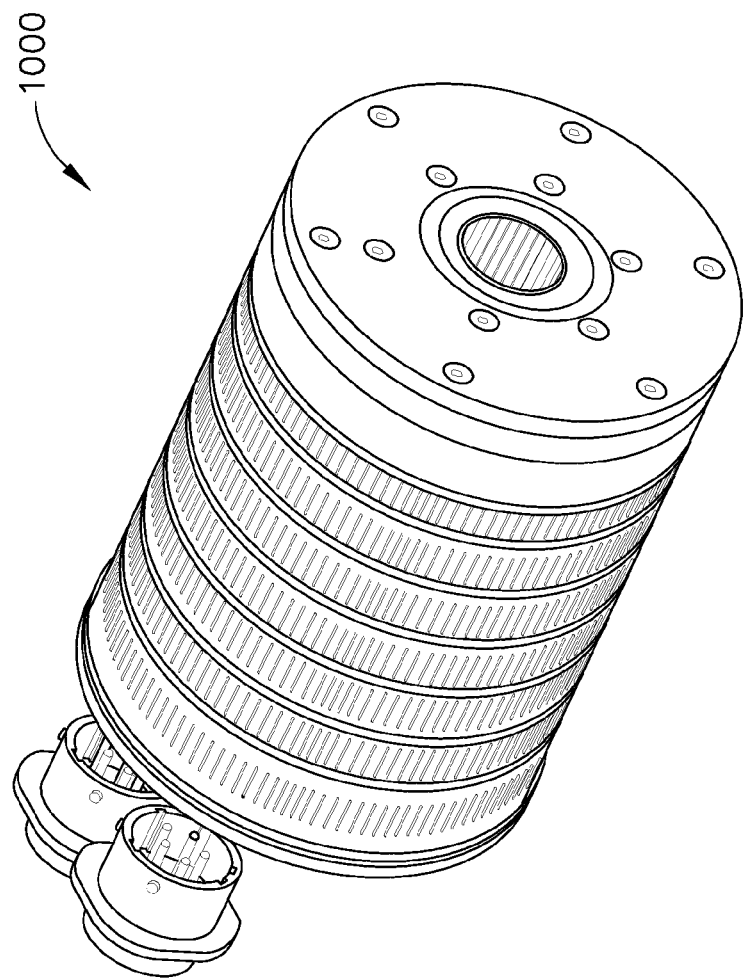
FIG. 10 illustrates the Starter/Generator (single machine) isometric view according to the first embodiment of the invention.

In the first embodiment, two identical Starter/Generators (S/Gs) are mounted in parallel, preferably in a single housing that constitutes the S/G assembly LRU. The two S/Gs mechanically interface with the speed increaser gear train 140 through the spline input shafts. The input shaft for each S/G incorporates a torque limiting shear section. Both Starter/Generators are mechanically and electrically independent. An isometric view of the Starter/Generator housing (single machine) 1000 is illustrated in FIG. 10.

The S/G Assembly 110 utilizes features consistent with applicable requirements; i.e., high reliability, minimal maintenance, all-attitude operation, low weight and small size. The design is well balanced and optimized for superior electromagnetic, structural, and thermal characteristics. One feature is that the electromagnetic design of the Starter/Generator can be optimally matched to unique customer requirements. The electromagnetic components can be sized for worst-case application requirements; i.e., 120 kW—5 second overloads. The Starter/Generator can then be verified and optimized for the starter torque during the start mode.

Another feature is the Dry Cavity design, in which no cooling oil is permitted to contact the insulation system used in the Starter/Generator construction, and in which no cooling oil is permitted in the Starter/Generator air gap. This "dry cavity" approach improves reliability over typical "wet cavity" designs in which oil is permitted to contact nonmetallic materials, such as the Starter/Generator insulation system. In the "dry cavity" approach, the insulation system is not degraded because there is no direct impingement of hot oil on the windings. Additionally, there is no eroded insulation material suspended in the oil, thus preventing oil contamination (especially useful in a shared oil system). Oil is neither sprayed nor mixed with air, so there is no frothing, and an air separator is not required. The absence of 'free oil' also reduces rotor windage losses.

Yet another feature is that Oil transfer tubes are brazed to the Starter/Generator rotor shaft to provide active rotor cooling and a reliable permanent oil seal at their connecting ends.

Still another feature is that the rotor is dynamically balanced, e.g., to 0.006 ounce-inches, thus ensuring a low level of self-induced vibration in the Starter/Generator.

Another feature is that the bearing loads are low and bearings are effectively lubricated, providing long bearing life. The bearings are assembled with a preload to improve high-speed performance.

Furthermore, electrical connectors can be sealed against oil leakage, and critical parts can be keyed for ensuring proper assembly.

Figure 11:
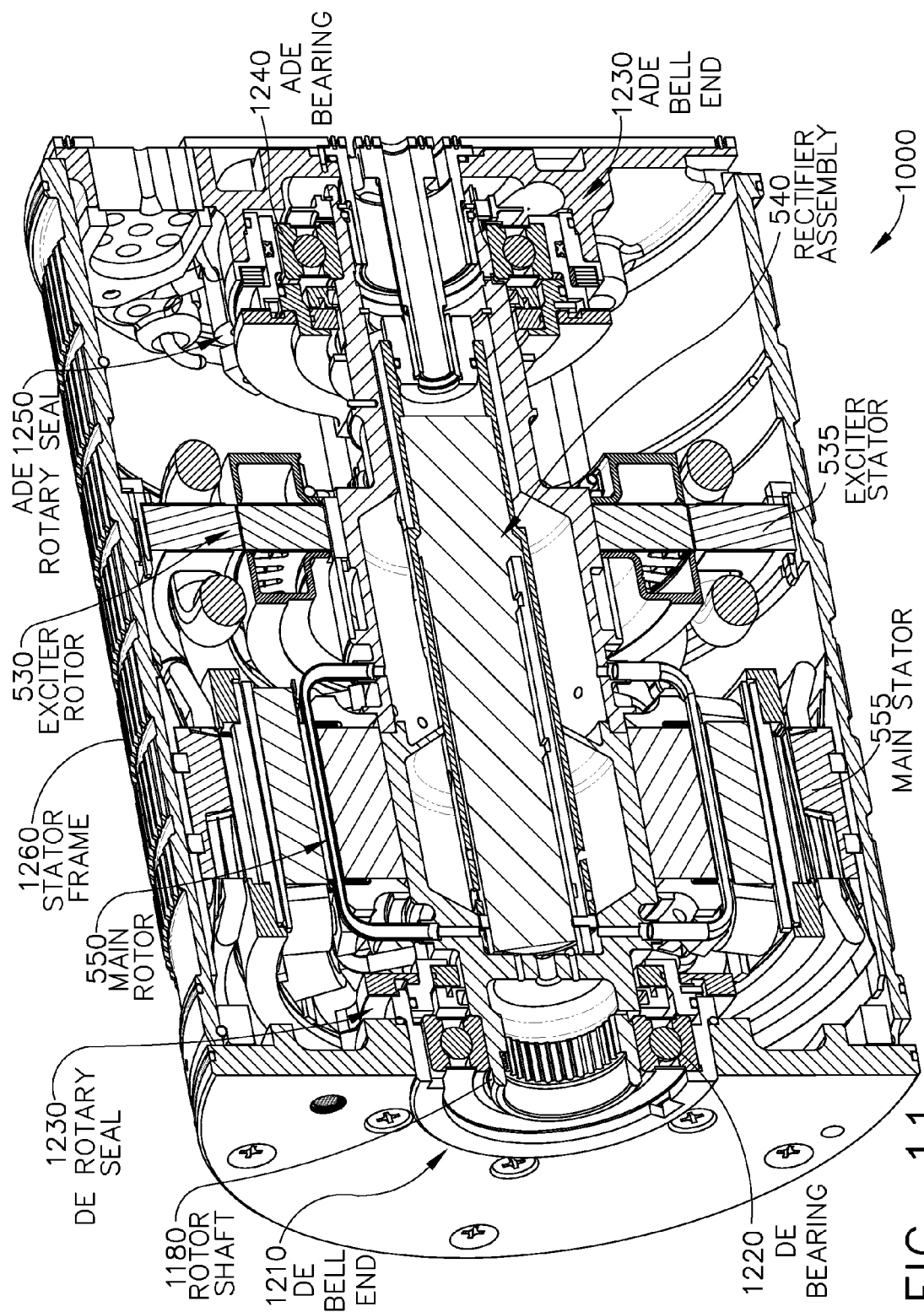
FIG. 11 illustrates the Starter/Generator sectional view according to the first embodiment of the invention.

Each of the two Starter/Generators includes two (2) machines, all inside a single frame: a) Rotating Rectifier Exciter Section, and b) Main Generator Section. A section view of the Starter/Generator is illustrated in FIG. 11, which shows: DE end bell 1210, DE bearing 1220, a main stator 555, an exciter stator 535, rectifier assembly 540, ADE end bell 1230, ADE bearing 1240, ADE rotary seal 1250, exciter rotor 530, stator frame 1260, main rotor 550, DE rotary seal 1260, and rotor shaft 1280.

The S/G construction will be described in detail hereinbelow. Starter/Generator construction is based on materials and processes that have been developed and used by the inventors, ensuring the S/G achieves the highest reliability with the least possible cost, size, weight, and schedule risk.

The S/G includes two main functional parts: the stator and the rotor. The stator is composed of an extruded aluminum cooling oil shroud, which houses the main stator and the exciter stator. The rotor is composed of a common shaft on which are mounted the main rotor and the exciter rotor. This one-piece, hollow shaft provides the oil flow paths for the rotor and contains the rotating rectifier system. High-speed, oil-lubricated bearings support the ends of the shaft. Carbon face circumferential seals are mounted inboard of the bearings to contain the bearing oil and ensure that free oil will not be introduced into the dry cavity of the rotating machine.

The insulation system is a combination of oil resistant, high-temperature materials. It is made up primarily of polyimide glass laminates and epoxides. Internal wiring may be done with all connections brazed. In one possible implementation, solder is not used in the Starter/Generator.

The main stator may be constructed of thin laminations punched from vanadium cobalt steel, which combines very high intrinsic saturation characteristics with low losses and excellent mechanical properties. The use of this steel ensures maximum utilization of space at the lowest possible weight.

After punching, the laminations are annealed at a controlled temperature for optimum magnetic characteristics and then further processed in a controlled atmosphere to provide interlaminar insulation and minimum core loss. These laminations, with special slot alignment, are stacked and bonded together with an epoxy under pressure to form a solid core. Each end of the stator core is insulated with a silicon glass laminate punched in the form of the steel laminations to eliminate the possibility of slot conductors electrically grounding to the iron core as they emerge from the slots.

The slots of the open-end stator core design are insulated, such as with "Kapton" film. Kapton is a trademark of DUPONT's polyimide film, previously known as "H" film. Stranded, round copper conductors insulated with heavy polyimide enamel (commonly known as DUPONT "HML") are inserted into the open slot.

An optimum combination of number of poles and slots provides power with optimum utilization of space. The stator winding is designed to reduce the amount of flux required to obtain rated output, reducing stator size and weight and minimize torque ripple during starting mode. The stator winding is two-layer, three-phase and 60° electrical displaced. This approach obtains maximum use of flux.

Multi-stranded windings reduce "skin effect" by effectively reducing any single-conductor, cross-sectional area. During the winding process, the windings are twisted in the end turns to transpose the conductors positioned in one slot to a different position in the return slot. This construction minimizes "deep bar" losses. The inventors' experience with this method of winding has been very successful on similar stators.

Figure 12:
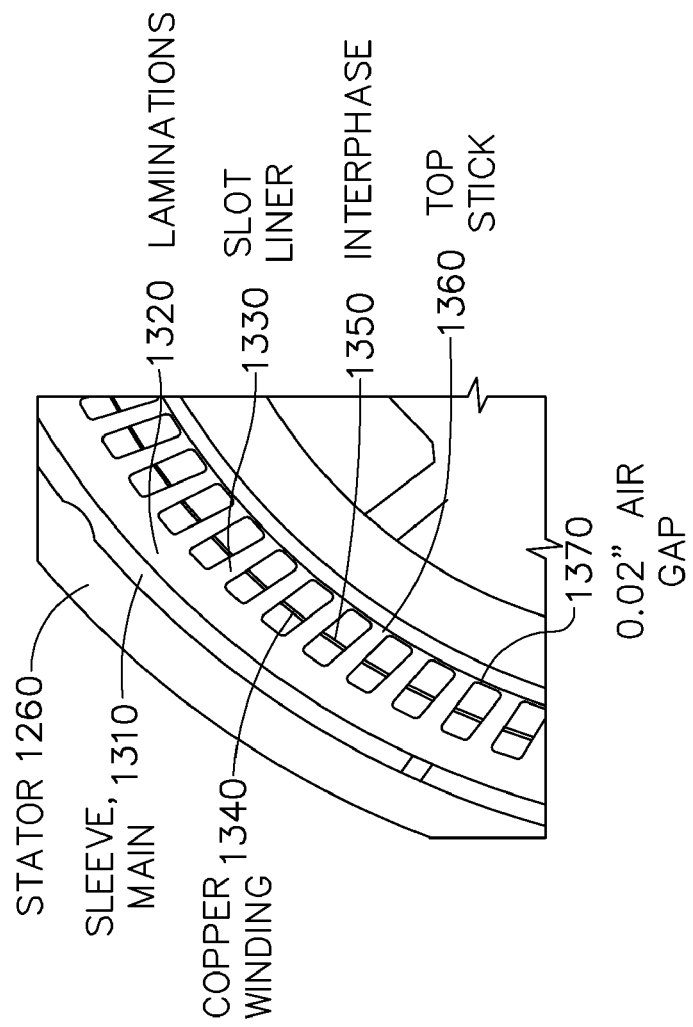
FIG. 12 illustrates the Main Stator sectional view according to the first embodiment of the invention.

Coils of different phase windings are separated within the slots with silicon glass laminate. After the conductor insertion, driving in a rigid polyimide glass laminate top stick closes the slot openings. A sectional view of the main machine stator 555 is illustrated in FIG. 12, whereby a stator frame 1260, main sleeve 1310, laminations 1320, slot liners 1330, copper windings 1340, interphase 1350, top stick 1360, and a 0.20" air gap 1370 are shown.

After the main stator buildup, the winding is impregnated via a vacuum pressure technique using a solventless epoxide compound, such as one developed by the assignee of this application. This compound fills all voids in the stator slot, bonding conductors and insulations within the slots and end turns. This void-free structure enhances heat transfer. The epoxide has excellent resistance to solvents and hot oils, providing for long life and high reliability. The processed stator core is then pressed into an extruded aluminum sleeve, which not only supports the core, but also forms one side of the oil cooling passages.

Flexible leads are attached to the end of the stator windings and routed to the electrical connector at the Anti-Drive End (ADE) of the ES/G system 100.

Field power is supplied to the main generator rotor winding by the exciter. Since this machine is a starter generator, the exciter provides excitation current to the main rotor for both starting and generating modes. During starting mode, the exciter performs as a three-phase, wound rotor induction machine operating in the braking mode. During generating mode, the exciter performs as an inside-out, three-phase synchronous generator. Therefore, the stator will carry two different windings. At the bottom of the exciter stator slots, there will be a three-phase, star-connected winding excited from a three-phase inverter. At the top of the slots, there will be dc field winding excited from a buck converter.

Thin laminations of vanadium cobalt steel are used to make up the stator and rotor of the exciter. An insulation system of a similar type defined for the main generator is used for the exciter rotor and stator. Heavy ML enamel round wire may be used in the windings.

Figure 13:
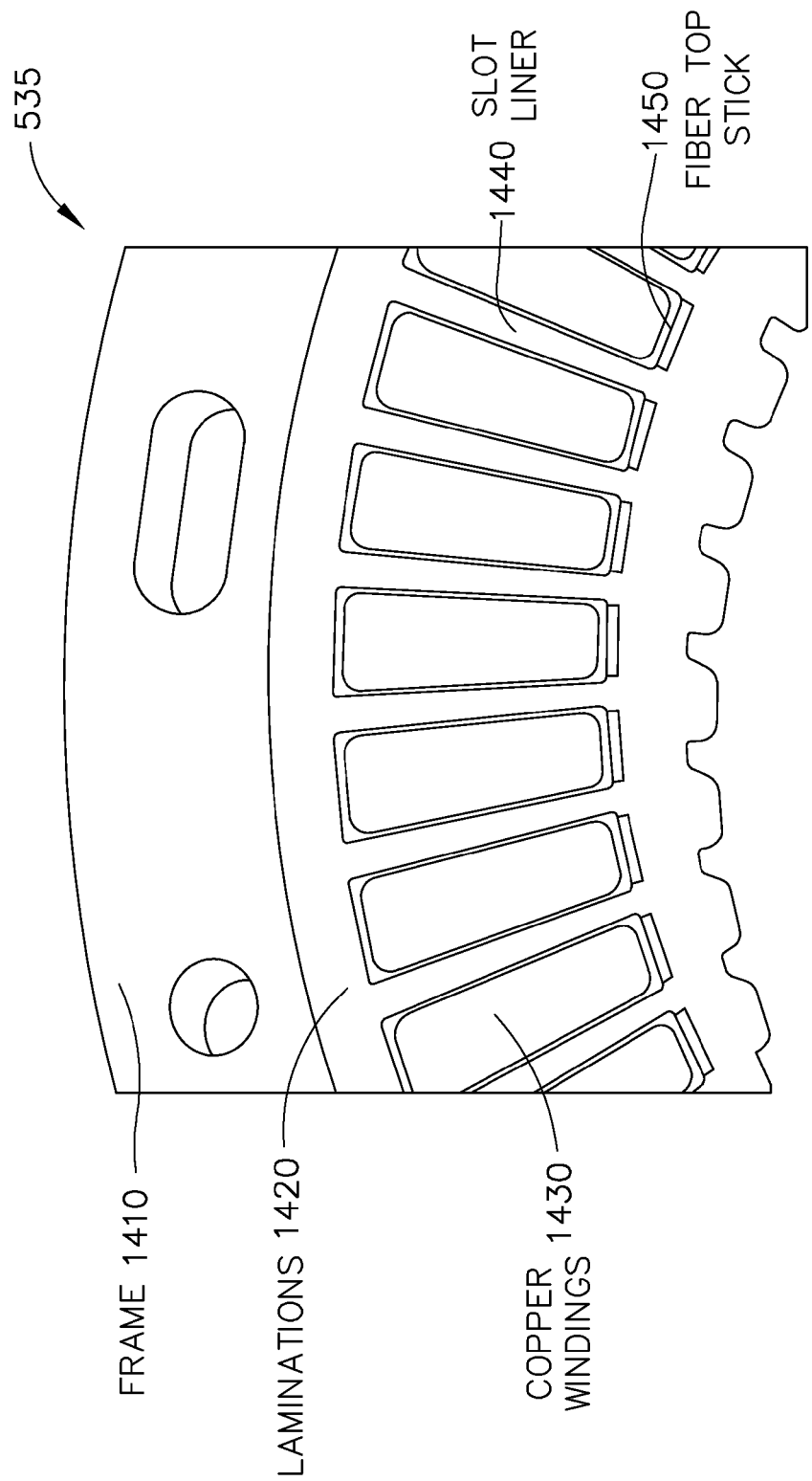
FIG. 13 illustrates the Exciter Stator sectional view according to the first embodiment of the invention.

The stationary exciter field core is press-fitted into the oil shroud positioned against the shoulder and is retained by radial pins through the shroud. A section view of the exciter stator section is illustrated in FIG. 13, and includes a frame 1410, laminations 1420, copper windings 1430, slot liners 1440, and fiber tops 1450 (at the end of the copper sections).

Figure 14:
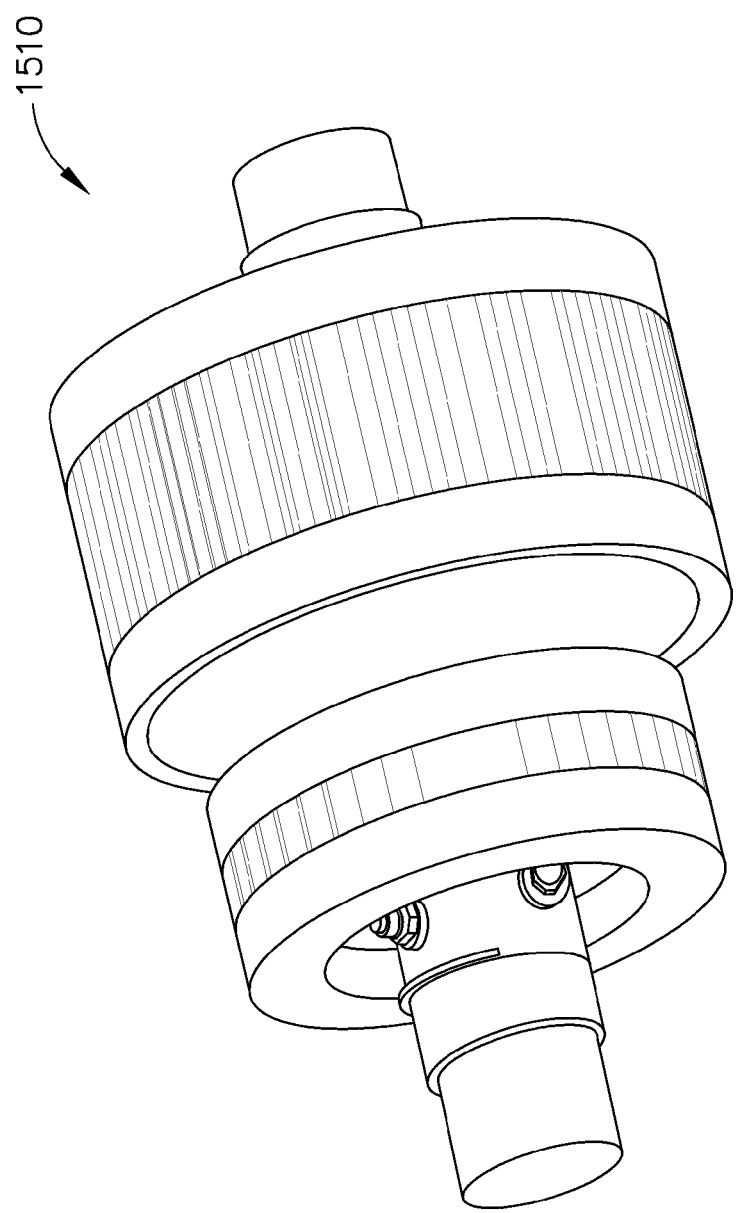
FIG. 14 illustrates the Rotor Assembly isometric view according to the first embodiment of the invention.

The Starter/Generator rotor comprises the main rotor 550 and the exciter rotor 530 that are mounted on a common shaft, and a rectifier assembly 540 that is mounted inside the shaft. The Starter/Generator rotor housing 1510 is illustrated in FIG. 14.

Figure 15:
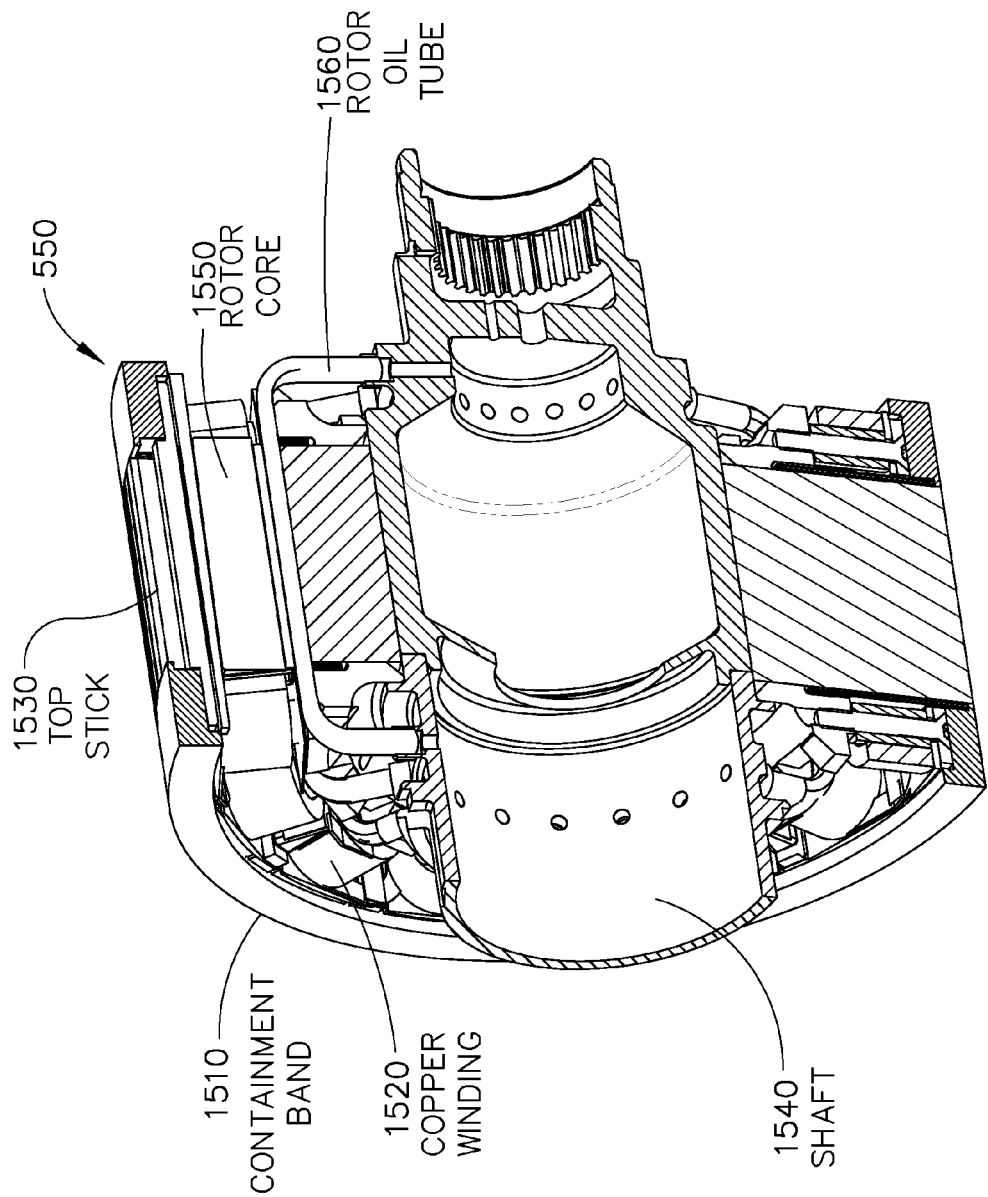
FIG. 15 illustrates the Main Rotor sectional view according to the first embodiment of the invention.

The main rotor 550 employs thin punchings of vanadium cobalt steel. The rotor punchings are processed through an annealing method, such as one developed by the assignee of this application, that provides a minimum yield strength required to withstand stresses encountered during high-speed operation of the rotor. This annealing process was developed for VSCF high-speed generator technology. The use of this annealing process and the rotor construction described below assures that the rotor will be stable throughout its operating environment, including overspeed to 34,500 rpm. A section of the main rotor 550 is illustrated in FIG. 15, and includes a containment band 1510, copper winding portion 1520, top stick 1530, rotor shaft 1540, rotor core 1550, and rotor oil tube 1560.

The design of the rotor punching also provides for high mechanical strength and the optimum use of material for stress and flux distribution. Located in the pole tips are amortisseur windings whose function is to reduce the commutating reactance of the Starter/Generator. Low losses in the amortisseur circuit are maintained by using a slot pitch nearly the same as the stator slot pitch.

Figure 16:
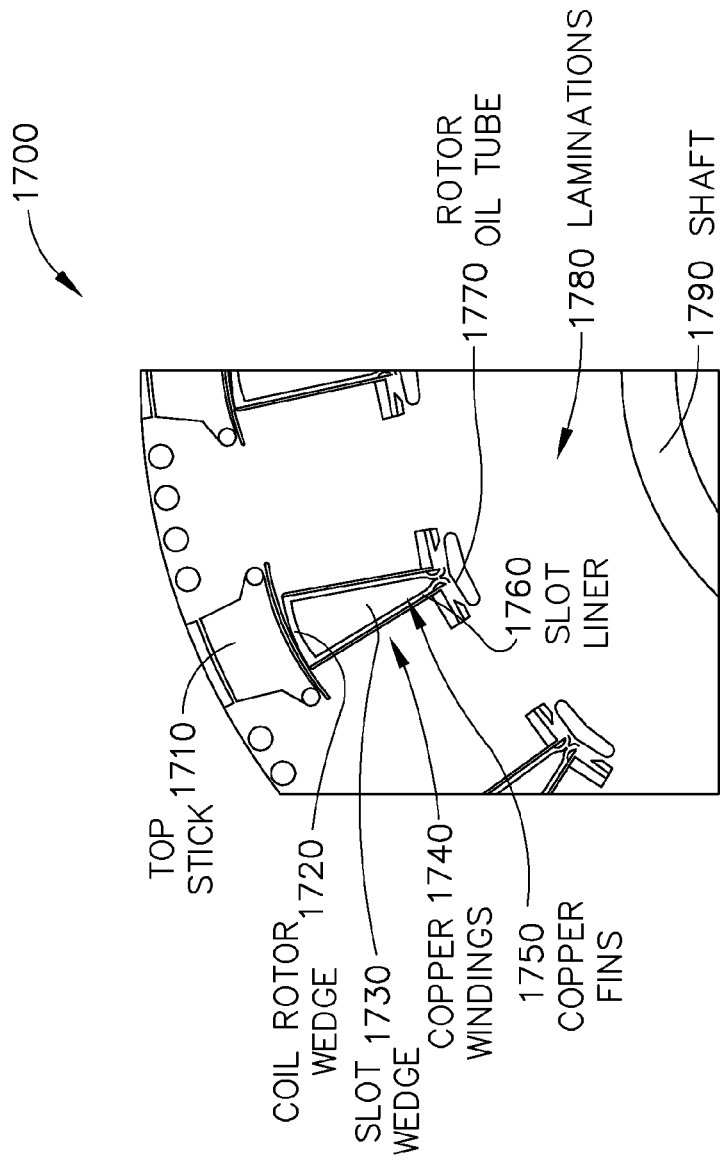
FIG. 16 illustrates the Main Rotor Slots sectional view according to the first embodiment of the invention.

After processing, rotor laminations are stacked, with the slot accurately aligned, to build up the rotor core 1700 as illustrated in FIG. 16. The rotor core 1700 includes a top stick 1710, coil rotor wedge 1720, slot wedge 1730, copper windings 1740, copper fins 1750, slot liner 1760, rotor oil tube 1770, laminations 1780, and shaft 1790. Copper end punchings are placed on each end of the stack and welded to the amortisseur bars inserted in the slots of the pole tips.

Oil tubes 1770 with copper fins 1750 are placed in the bottom of each slot 1730 to transfer heat from the coil to the cooling oil. Coil liners or insulators of "Kapton Film" are inserted in each slot 1730 and precision-wound coils of "HML" insulation are accurately placed on each pole. Rectangular-shaped or flat conductors are chosen to permit better coil heat transfer and more efficient use of copper in the slot than can be achieved with round conductors. The V shaped aluminum wedge is then placed in the slot between the two coils and a set of aluminum wedges and a titanium slot wedge are inserted, which compress the windings of both coils radially and tangentially. Using vacuum and pressure techniques, the partially completed rotor is impregnated with an epoxide compound. The rotor is then baked to set the compound. Impregnating the rotor with epoxide imparts high bond strength to the structure, produces optimum heat transfer qualities, and gives added protection and strength to the rotor insulation. The titanium slot wedges that extend over the end turns are then machined at their ends to receive interference-fit titanium end rings.

A three-phase winding is inserted in the slots of the rotating exciter armature. Polyimide glass laminated top sticks hold the armature conductors in place. Armature end turns are held with high strength titanium end caps, which prevent the secured end turns from shifting. The exciter rotor is pressed on the shaft against a shoulder and held with a key and welded in place to eliminate any possibility of axial movement.

The small heat losses from the exciter are conducted to the oil circuits inside the shaft and into the oil shroud. Average temperatures existing in the exciter stator and rotor are 25° C. or more cooler than those existing in the main generator electromagnetics.

Figure 17:
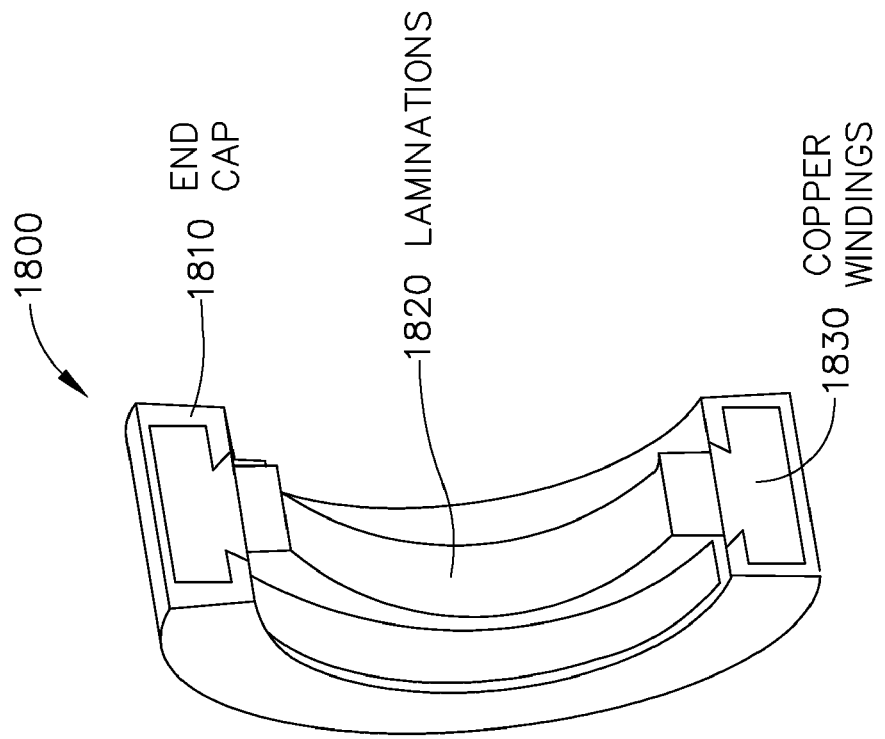
FIG. 17 illustrates the Exciter Armature sectional view according to the first embodiment of the invention.

The exciter armature 1800 is illustrated in FIG. 17, and includes an end cap 1810, laminations 1820, and copper winding 1830. Conversion of the three-phase exciter armature AC output to DC for the main field is the function of the rotating rectifier system. A full-wave bridge is utilized for this system. This three-phase bridge is of a relatively simple construction and lends itself to easy replacement as an assembly. The construction includes a polyimide glass laminate ladder, rectifiers, and aluminum tube. The rectifiers are mounted on the ladder and the subassembly is inserted into an aluminum tube. This assembly is easily inserted inside the S-G shaft and is held securely in place. Rectifiers achieve the suppression of voltage transients in the rectifier circuit. The rectifiers are cooled directly by oil flowing through the center of the shaft and over the rectifier assembly. This method of cooling ensures that the rectifiers operate at very low junction temperatures and inherently have excellent reliability and long life. The rectifier assembly makes use of brazing for connections and does not use solder (the lead content of solder would potentially contaminate the oil).

The bearing system includes two deep-grooved, ball bearings, such as Conrad-type ball bearings, size 107, with one at each end of the rotor. The bearing races are of high quality tool steel, e.g., M-50 tool steel, and ball complements are ceramic and are manufactured to a fine precision, e.g., to an ABEC-7 precision. Silver-plated, precision-machined, bronze ball cages may be used. The bearings are mounted on the shaft and into steel sleeves in the end bells with closely controlled fits. The outer races are mounted in a manner so as to prevent their rotation. An axial spring load is applied to control clearances and increases bearing stiffness. The DE bearing is clamped to prevent axial movement and the ADE bearing is allowed to float in an axial direction. This setup allows differential thermal expansion between the rotating and stationary assemblies.

Cooling and lubrication of the bearings is accomplished by taking oil from the center of the shaft through controlled orifices that regulate the amount of oil flow. The bearing's ceramic balls provide extended life and reliability.

The oil-cooled Starter/Generator employs both static and hydrodynamic seals. These seals are designed to prevent oil leakage at all oil interfaces. The seal materials are selected to provide the storage and operational lives required by the specification.

The static seals employed are of two types, O-rings and a "Gask-O-Seal". O-rings are used at all locations where sealing is required, except at the antidrive end interface with the housing end bell where a "Gask-O-Seal" is used. Seal material may be fluorocarbon, which has long life and high resistance to cooling oil. Design of the O-rings are such that the fit will be correct and that no leakage occurs.

At the generator ADE where the oil interface with the housing end bell occurs, a "Gask-O-Seal" is used. This seal is constructed by molding fluorocarbon seal elements into a grooved metal plate, permitting positive and accurate location of the seal in the joint. The seal design is such that when the joint is made, the seal material compresses with metal-to-metal contact maintained so that the joint is not weakened.

Precision carbon face seals are located inboard of each bearing. Special attention has been given to the selection of these seals with respect to the internal construction and materials used to ensure the highest reliability and performance.

Circumferential seals are comprised of two primary parts: carbon segments contained in a seal housing and mating seal runner. The segments are radially loaded against the shaft using a garter spring, and each segment is locked against rotation. The combination of compression and garter springs ensures that the segments remain in contact with mating surfaces during low delta pressure and shutdown conditions. The exceptionally lightweight carbon material and custom housing configurations make it easy to install, remove, or repair seals in limited space areas.

The seal runner is mounted on the shaft, while the stationary seal assembly is installed into the seal housing. The satisfactory performance is made possible by separating the two faces with a lubricating film, which is established by hydrodynamic forces.

The S/G shaft is constructed of aircraft quality steel, e.g., AISI 4140 steel, heat-treated to develop high strength and excellent stability. The shaft is fabricated to permit forming of the necessary oil passages and to achieve the minimum weight and highest strength. The resultant shaft is a permanent one-piece assembly, which supports the rotating components. Power input to the generator is made through the stub shaft which mates with an internal spline in the main shaft. This internal spline is precision shaped and hardened to ensure long life and reliability. Continuous oil lubrication of the spline ensures that spline wear is minimized.

Figure 18:
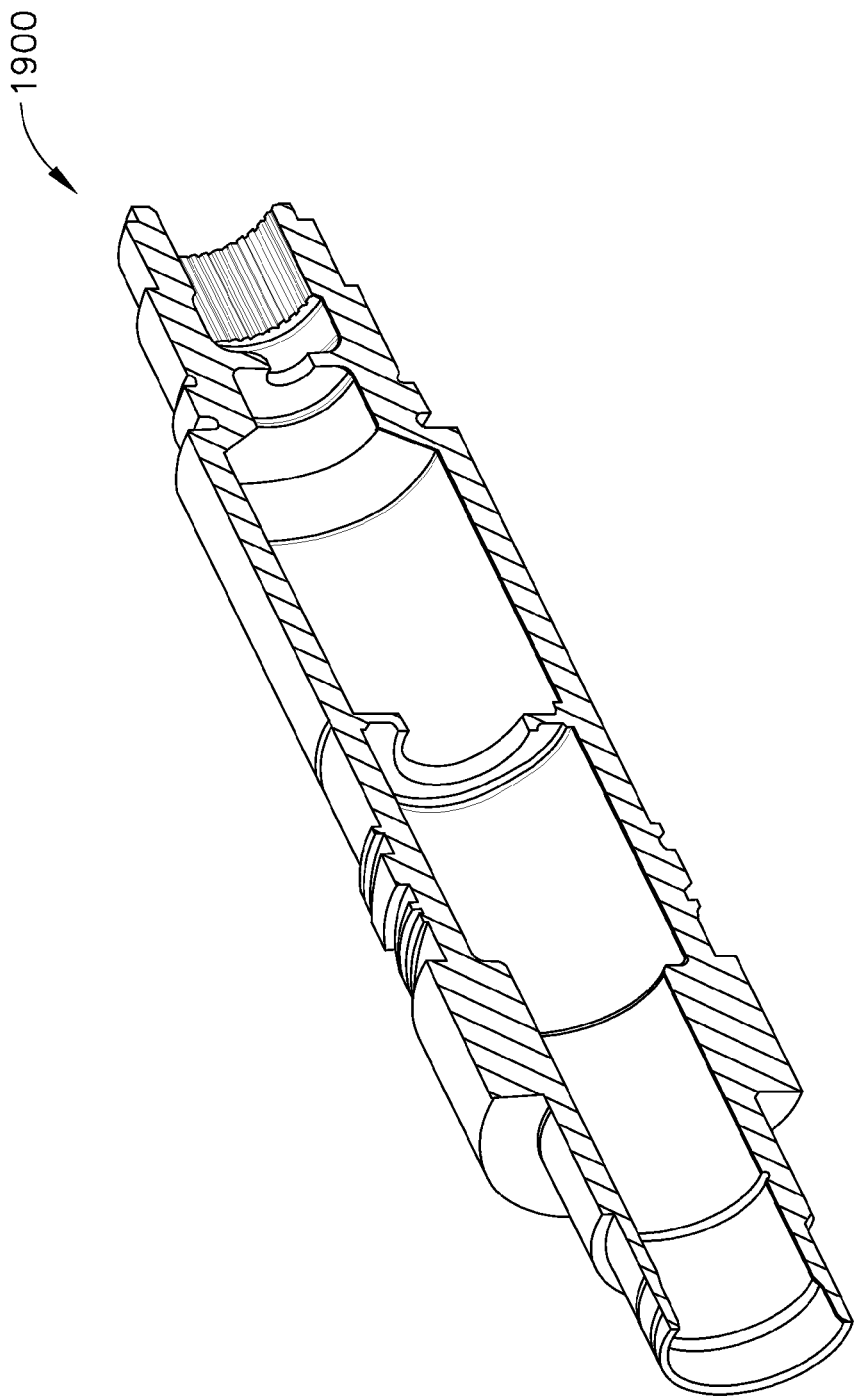
FIG. 18 illustrates the Input Shaft sectional view according to the first embodiment of the invention.
Figure 19:
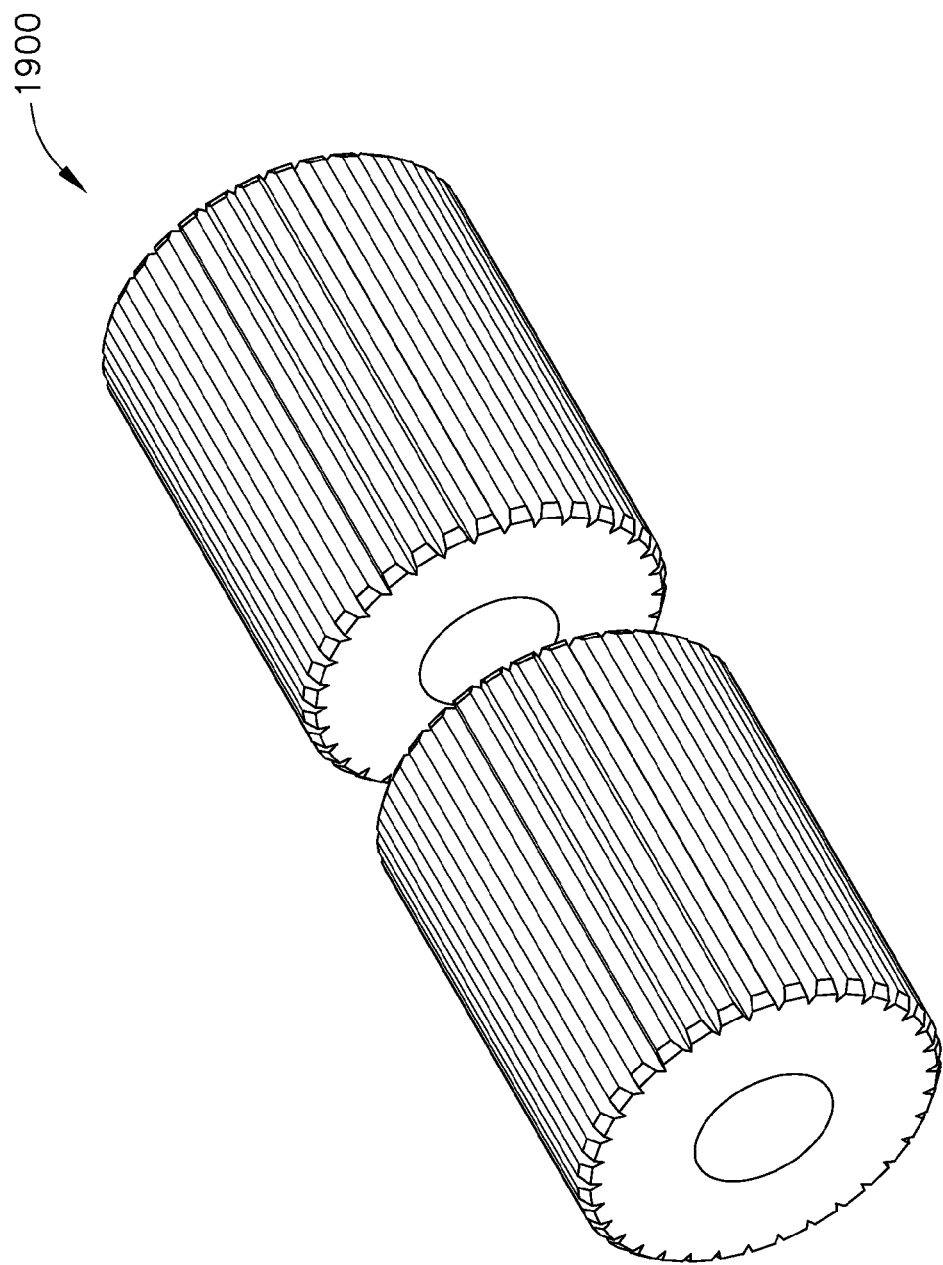
FIG. 19 illustrates the Input Shaft isometric view according to the first embodiment of the invention.

The Starter/Generator input shaft provides interface between the S/G 102A, 102B and the speed increaser gear train 140, and one is provided for each of the two S/Gs 102A, 102B in the ES/G Assembly 110. In one possible implementation of the first embodiment, it is machined from an AMS6414 steel bar. The splines are shot peened and nitrided to $R_{15N}88$ for wear resistance. The shaft core is hardened, for example, to Rc 30-35. The input shaft's splines are oil lubricated. The input shaft incorporates the torque limiting shear area. The shear torque in one possible implementation is set to 300 ft-lb. In case of input shaft, shear the spring mounted inside the stub shaft will separate the two halves to not generate any debris while the gear is still rotating. A section view of the Starter/Generator input shaft 1900 is illustrated in FIG. 18, and an isometric view of the Starter/Generator input shaft 1900 is illustrated in FIG. 19.

The insulation system used in the Starter/Generator is an oil-resistant, high-temperature system that has been developed for aircraft and aerospace applications. The insulation system makes full use of polyimides and epoxies to produce insulation that withstands the environmental and electrical requirements. One feature of the insulation system is vacuum pressure impregnation of the electrical components in a solventless epoxy, a process providing a virtually void-free system that greatly enhances heat transfer and provides for excellent mechanical stability along with long life. The insulation materials used in the Starter/Generator housing are selected and applied to withstand the dielectric strength requirements.

The main power generation field windings may be of silver bearing copper material. While the conductor demonstrates low electrical resistance, the material has very limited structural strength. Therefore, it is necessary to rigidly contain the end turns in the rotor.

The end turns of the rotating field windings are contained within high-strength titanium bands that are shrunk onto the ends on a field stack. The coil windings are supported from radial movement, such as by a wedging method. The bottom turn of the rotor coil (as it bends around the end of the rotor stack) rests on and is insulated from aluminum coil supports, which are pressed onto the rotor shaft. An insulation plate and an aluminum plate are located on the top of the coil and the assembly is clamped to the coil support by screws. Polyimide tubing insulates the screw shank. After the end turn is prepared, the outer diameter is turned to size to provide a shrink fit for the titanium containment band. As an added retention feature, the titanium bands are tack welded to the stack at the top sticks to prevent axial movement.

High-speed operation requires excellent rotor balance not only for a new rotor, but also throughout the useful life of the Starter/Generator. The required precision of rotor balance is achieved by the design and manufacturing practices. Some specific considerations are: a) Precision dies are used to make symmetrical parts; b) Close fitting fin tubes, coils, wedges, etc., ensure symmetry of installed slot components; c) Vacuum impregnation, combined with rotational curing, precludes any insulation imbalances; and d) Using impregnation varnish with 100 percent solids in the associated with close fitting parts eliminates voids.

The rotor components are symmetrically located around the centerline of the shaft. Each rotor component is rough balanced before assembly on the shaft. The final balancing is performed on the complete rotor assembly. The rotor assembly is balanced dynamically at a high speed, e.g., 2,000 rpm, to a preset limit of, for example, 0.006 oz-in maximum. The final balancing is achieved by removal of material in specified areas. This approach has been successfully used on other sub-critical speed rotors tested by the inventors.

After balancing, the rotor is assembled into a Starter/Generator and load tested with rated cooling. While the Starter/Generator is hot, the load is removed and the generator is operated at the specified overspeed. Vibration and performance are monitored before and after overspeed. An acceptable rotor will not lose its balance as a result of the overspeed tests. The vibration level must be acceptable at normal and overspeed conditions. The vibration limits are the result of analysis and experience.

The results of Starter/Generator testing on similar rotors at speeds up to 35,000 rpm indicate that the rotor design, manufacturing process, balance process and test methods combine to provide a rotor with stable dynamic characteristics for long-life applications. The anticipated change in rotor balance over its operating life does not affect the vibration characteristic of the Starter/Generator.

Dynamically balancing subassemblies of the rotor before final assembly reduces the Starter/Generator unbalanced forces at operating speeds by distributing the balance correction to coincide with the unbalanced subassembly.

Figure 20:
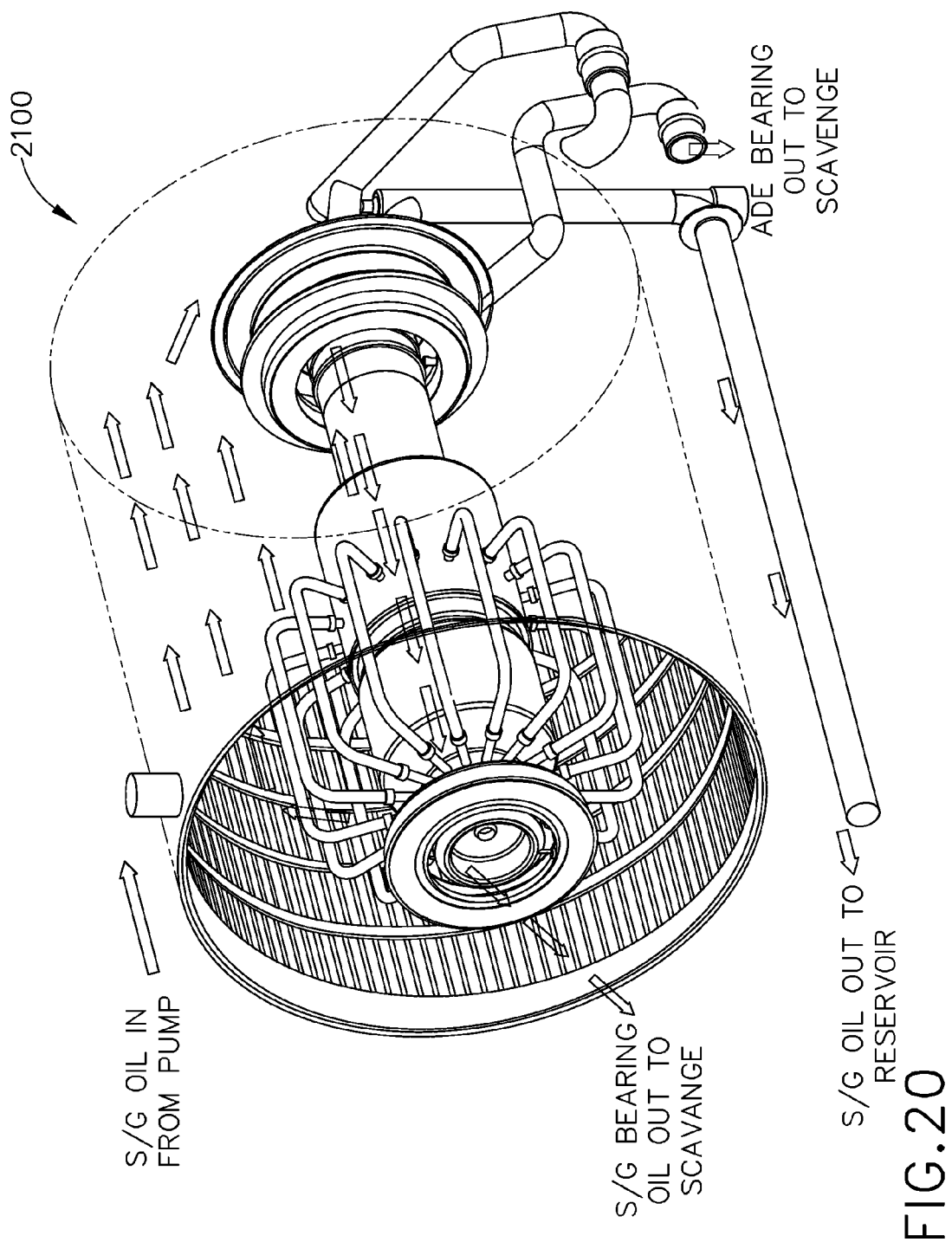
FIG. 20 illustrates the flow of oil within the ES/G Assembly according to the first embodiment of the invention.

The Starter/Generator oil system 2100 is illustrated in FIG. 20. The stator oil circuit is comprised of a Starter/Generator oil shroud. The oil shroud is an extruded aluminum tube heat exchanger design with axial passages for single-pass, parallel oil flow. Manifolds at each end provide for oil inlet and outlet distribution and are designed to supply uniform flow over the entire periphery. O-Ring seals are provided at the outboard end of the manifold to prevent oil leakage. Oil is supplied to the drive end manifold at the top of the Starter/Generator (see upper arrows in FIG. 20). Oil then flows axially through the parallel stator cooling slots to the return manifold at the antidrive end of the Starter/Generator; then exits 180° away from the inlet (see lower arrows in FIG. 20). By providing the inlet and outlet 180° apart, all oil paths are essentially the same length, and the oil distributes evenly.

Oil exiting from the stator is separated into two paths via a flow control orifice; part of the oil is returned directly to the oil return line and the rest is fed to the rotor through a stationary transfer tube that is accurately positioned inside the rotating Starter/Generator shaft. The oil flows through the center of the shaft and, by conduction, cools the rectifiers and Exciter/Main rotor.

At the DE (drive end) of the rotor shaft, the flow is split between the DE bearing/drive spline and the main rotor winding flow paths. A small amount of oil exits the rotor through a metering orifice located at the rotational centerline and provides lubrication to the bearing and drive spline. The balance of the flow is introduced to the main rotor oil tubes. The oil passes through the rotor oil tubes located in the bottom of the rotor slots and collects in a manifold on the antidrive end of the rotor. The oil is discharged through an outer channel of the shaft and back to the transfer tube where it exits from the rotor. A seal at this point limits the oil leakage into the antidrive end bearing cavity.

At each end of the shaft, orifices are provided to meter a controlled amount of oil from the shaft for bearing lubrication and oil seal cooling. A stream of oil is directed into the bearing cavities and mixed to form an air-oil mist that coats the ball complement and races, providing both lubrication and cooling. Oil is collected in small cavities on the opposite side of the bearing and returned to the oil reservoir through the scavenge line. The drive end bearing drains directly into the speed increaser scavenge system.

The oil-cooled S/G contains a uniquely designed drain system, which ensures that leakage oil from whatever source (normal leakage, seal failure, oil circuit failure, etc.) will not accumulate and cause a failure. The drain system also ensures the S/G will operate in all-attitude flight of the aircraft, including zero-g and negative-g conditions, without affecting oil system operation.

There are two separate scavenge lines dedicated for scavenging the S/G: DE S/G scavenge line and ADE S/G scavenge line. Any oil leakage that may enter the Starter/Generator cavity is removed via cavity drains located at each end of the unit and returned back to the oil reservoir through one of the S/G scavenge lines. The size and location of the drains are designed to prevent any significant accumulation of oil considering the maximum permissible leakage and the aircraft attitudes.

Mounted on the antidrive end of the shaft is a small volute cavity outboard of the bearing. The volute contains a drain outlet tangential to the circle. Oil fed to the bearing from the shaft either forms an air-oil mist that passes through the bearing or collects and drains to the circular cavity through channels around the bearing. The tangential opening in the circular cavity provides an exit for the oil. This oil is returned to the oil reservoir through a scavenge line.

The drive end bearing is fed oil from the center of the shaft similar to the antidrive end bearing. This oil again either forms an air-oil mist that passes through the bearing or collects and drains through channels around the bearing. This oil drains directly into the speed increaser scavenge system and it is returned to the oil reservoir through the scavenge line.

The PMG 145 supplies power for converter regulators and the control exciter field. The PMG 145 is mounted at the drive end of the Starter/Generator Assembly in its own housing. The stator is wound with six three-phase, separate, and electrically isolated windings.

Cobalt magnetic steel laminations make up the permanent magnet generator stator. In one possible implementation, an HML and NOMEX insulation and winding system is used in the stator slot core and the wound assembly is impregnated with the epoxy compound. The stator is pressed into the oil shroud and retained by pinning.

The rotor design includes solid pole faces and high-energy product Summarium Cobalt permanent magnets mounted on a hub assembly and held together by a nonmagnetic shrink ring (e.g., an Inconel nonmagnetic shrink ring). Two nonmagnetic, stainless steel side plates are also incorporated to contain the magnetic material at high speeds. This construction provides distinct mechanical and electromagnetic advantages over rotors of cast aluminum or laminated magnetic material construction.

Both stator and rotor of the permanent magnet generator are high efficiency electromagnetics resulting in minimum cooling requirements. Temperatures in these components are lower than in the main rotor or stator and afford additional margin for long life and high reliability.

Figure 21:
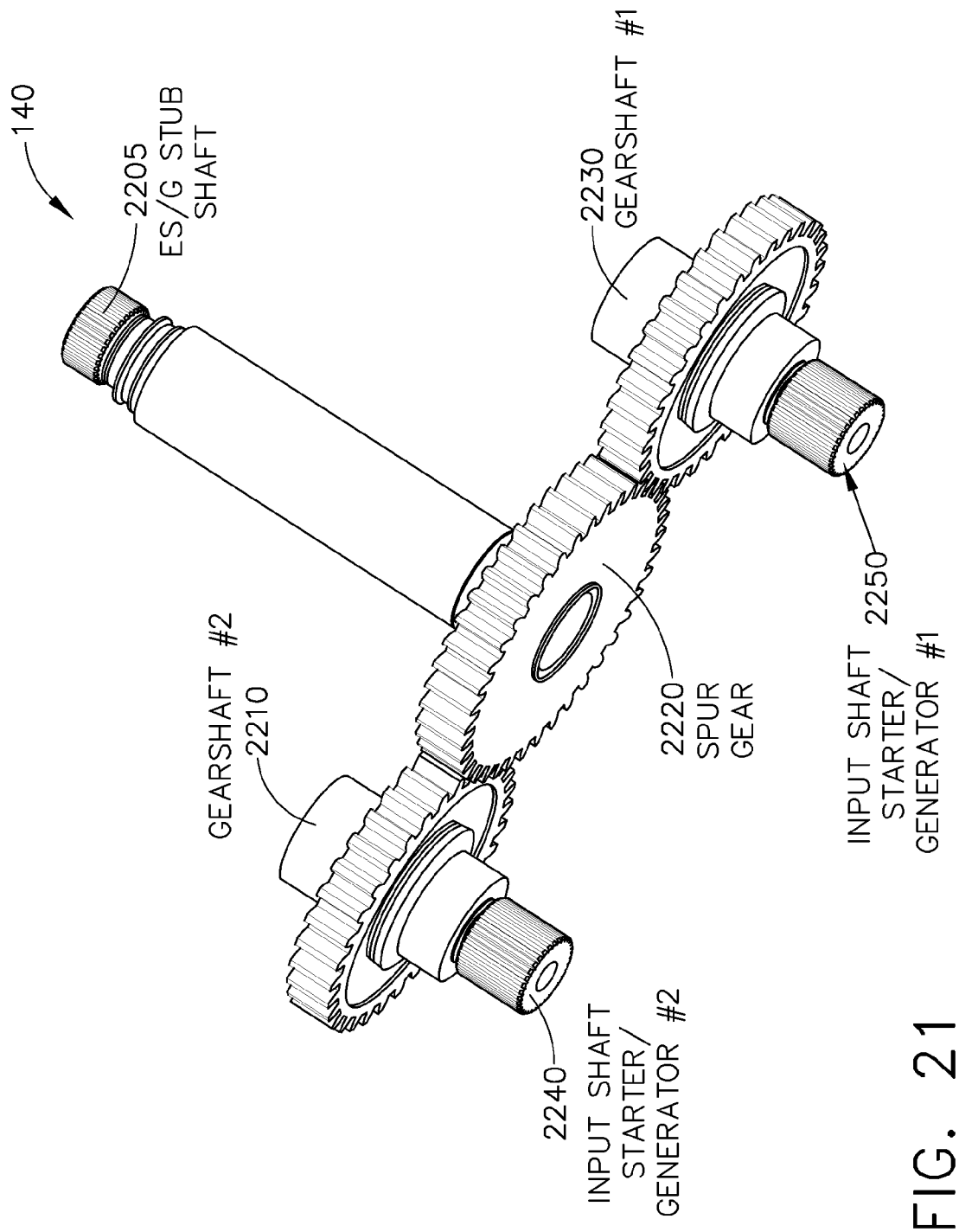
FIG. 21 illustrates the Speed Increaser Gear Train isometric view according to the first embodiment of the invention.

The speed increaser gear train 140 is illustrated in FIG. 21. The speed increaser gear train 140 includes a Starter/Generator Assembly stub shaft 2105, three (3) gear elements 2210, 2220, 2230, and two (2) Starter/Generator input shafts 2240, 2250 used to increase the engine gearbox's drive pad speed during the generating mode and supply the engine gearbox's drive pad with necessary torque during the start mode.

The pad output speed of 15,500 to 27,075 rpm during the generator mode is increased by the speed increaser gear train 140, which via a speed increase ratio of 1.2:1 results in a Starter/Generator operating speed of 18,600 to 32,490 rpm. The overspeed requirement of 28,698 rpm results in a maximum Starter/Generator rotor speed of 34,438 rpm, which is within the rotor design's critical speed range.

The spur gear 2220 meshes with two like gearshafts 2210, 2230 providing the input drive to Starter/Generator No. 1 and to Starter/Generator No. 2. The two Starter/Generator input drives utilize spline couplings to provide the final drive to each Starter/Generator. The engine gearbox drives the Starter/Generator Assembly stub shaft 2205 in the normal operating mode. In the start mode, the Starter/Generator functions as starter motors that combine their output torques to drive the Starter/Generator Assembly stub shaft 2205 to start the engine via the engine gearbox. This results in an engine start that loads the gear teeth in the opposite direction.

The two Starter/Generator gearshafts 2210, 2230 are designed alike and are interchangeable. Both are providing the Starter/Generator input driven through spline couplings. In the start mode, each starter/generator will function as a starter motor providing a total of 115 ft.-lb. of starter torque from 0 to 5100 rpm. The gears may be made of 9310 steel per AMS 6265, carburized and ground AGMA 11 quality for accuracy and an extended life.

The two gearshafts 2210, 2230 are mounted on their own sets of bearings to minimize the fault propagation. If one of the input shafts to the S/G would shear, the gear will be rotating idle without affecting the other Starter/Generator. No protective coating or plating is required because the gearing and couplings are in an oil-wetted environment.

The bearing system includes two deep-grooved, Conrad-type ball bearings, size 107, with one at each end of the rotor. The bearing races are of high quality M-50 tool steel and ball complements are ceramic and are manufactured to an ABEC-7 precision. Silver-plated, precision-machined, bronze ball cages are used. The bearings are mounted on the shaft and into steel sleeves in the speed increaser housing with closely controlled fits. The outer races are mounted in a manner so as to prevent their rotation. An axial spring load is applied to control clearances and increase bearing stiffness. The DE bearing is clamped to prevent axial movement and the ADE bearing is allowed to float in an axial direction. This setup allows differential thermal expansion between the rotating and stationary assemblies. The same bearings are used on the Starter/Generators.

Precision carbon face seals are located on a spur gearshaft inboard of each bearing and at the DE of the Starter/Generator Assembly. The two seals mounted inboard of the bearings maintain PMG dry cavity and the DE seal maintains engine gearbox interface dry cavity.

Circumferential seals are comprised of two primary parts: carbon segments contained in a seal housing and mating seal runner. The segments are radially loaded against the shaft using a garter spring and each segment is locked against rotation. The combination of compression and garter springs ensures that the segments remain in contact with mating surfaces during low delta pressure and shutdown conditions. The exceptionally lightweight carbon material and custom housing configurations make it easy to install, remove, or repair seals in limited space areas.

The seal runners are mounted on the shaft, while the stationary seal assemblies are installed into seal housings. The satisfactory performance is made possible by separating the two faces with a lubricating film, which is established by hydrodynamic forces. These seals are designed and dynamically tested to meet the customers' demands. The same seals are used on the Starter/Generators.

The spur gear 2220 and gearshaft bearings are lubricated by oil supplied through the oil passages in the speed increaser housing. At the inlet line to each bearing, orifices are provided to meter a controlled amount of oil supplied for bearing lubrication and oil seal cooling. A stream of oil is directed into the bearing cavities and mixed to form an air-oil mist that coats the ball complement and races, providing both lubrication and cooling. Oil is collected in the speed increaser scavenge system and returned to the oil reservoir through the speed increaser scavenge line.

Each gear mesh is lubricated by jetted oil. The oil flows through the oil passages in the speed increaser housing and is jetted on the gear mesh by the nozzle. The oil is collected by the speed increaser scavenge system and returned to the oil reservoir through the speed increaser scavenge line.

The oil supplied from the Starter/Generator shaft lubricates the Starter/Generator input shaft's spline. The oil enters through the transfer tube mounted in the center of the input shaft and returns on the outside of the transfer tube into the speed increaser scavenge system, lubricating the spline. Then, oil is returned to the oil reservoir through the speed increaser scavenge line.

The PMG rotor and the Starter/Generator Assembly stub shaft's spline are lubricated by the oil nozzle directing oil into the transfer tube mounted in the center of the spur gear shaft and returned on the outside of the transfer tube into the speed increaser scavenge system, cooling the PMG rotor and lubricating the spline. Then, oil is returned to the oil reservoir through the speed increaser scavenge line.

The PMG stator incorporates the oil shroud. The oil shroud is an extruded aluminum tube. Manifolds at each end provide for oil inlet and outlet distribution and are designed to supply uniform flow over the entire periphery. O-Ring seals are provided at the outboard end of the manifold to prevent oil leakage. Oil is supplied to the manifold at the bottom and then flows axially through the stator to the return manifold and then exits through the PMG scavenge line into the oil reservoir.

The rotary seal and baffle mounted in the front of the Starter/Generator Assembly maintains the interface dry cavity. Any oil that would leak through the DE rotary seal is directed through the oil drain into the speed increaser scavenge system and returned to the oil reservoir through the speed increaser scavenge line.

The housing assembly includes the PMG and speed increaser housing bolted to the Starter/Generators housing and closed with two (2) Starter/Generator end bells. All oil, air, and wire passages are an integral part of the housing. The shape of the housing is optimized for the functionality, performance, and weight. The ES/G direction of rotation can be marked on the top of the housing. In one possible implementation the housing and end bell material is cast magnesium, which has an excellent history of corrosion resistance, strength, and reliability. This alloy maintains its good mechanical properties at elevated temperatures.

Many other changes and modifications may be made to the present invention without departing from the spirit thereof. The scope of these and other changes will become apparent from the appended claims. For example, some elements described with regards to the embodiments of the present invention may be implemented in software being run on a general purpose computer or by a special purpose computer, and/or by application specific integrated circuits (ASICs) or field programmable gate arrays (FPGAs), or a combination thereof.

The invention claimed is:

1. An aircraft starting and generating system, comprising:
   a first starter/main machine assembly that includes a first exciter and a first main machine;
   a second starter/main machine assembly that includes a second exciter and a second main machine;
   a permanent magnet generator (PMG) that is connected to the first and second starter/main machine assemblies;
   a gear train provided between the first main machine and the PMG and between the second main machine and the PMG, the gear train providing a speed increasing function;
   a first inverter/converter/controller (ICC) that is connected to the first starter/main machine assembly and to the PMG; and
   a second ICC that is connected to the second starter/main machine assembly and to the PMG,
   wherein the first and second ICCs generate AC power to respectively drive the first and second starter/main machine assemblies in a start mode of the starting and generating system for starting a prime mover of the aircraft, and
   wherein the first and second ICCs convert AC power, respectively obtained from the PMG after the prime mover has been started, to DC power in a generate mode of the starting and generating system.

2. The aircraft starting and generating system according to claim 1, wherein the first and second exciters each include a stator and a rotor, and wherein each of the stators includes a winding that is configured to work conjunctionally with a contactor to function as an AC winding during the start mode, and that is configured to work conjunctionally with the contactor as a DC winding during the generate mode.

3. The aircraft starting and generating system according to claim 2, wherein the contactor provides connection of an exciter IGBT bridge with the exciter stator during the start mode.

4. The aircraft starting and generating system according to claim 1, wherein the first ICC comprises:
   a main insulated-gate bipolar transistor (IGBT) bridge that is connected to a main stator of the first main machine;
   and an exciter IGBT Bridge that is connected to an exciter stator of the first exciter.

5. The aircraft starting and generating system according to claim 4, wherein the second ICC comprises:
   a main IGBT bridge that is connected to a main stator of the second main machine; and
   an exciter IGBT Bridge that is connected to an exciter stator of the second exciter.

6. The aircraft starting and generating system according to claim 1, further comprising:
   a full wave or half-wave rectifier,
   wherein the first and second exciters each includes an exciter rotor and an exciter stator, and
   wherein the full wave or half wave rectifier is provided on a shaft of the exciter rotors of the first and second exciters, and rotates with rotation of the exciter shafts of the first and second exciters.

7. The aircraft starting and generating system according to claim 1, further comprising a stub shaft for coupling the PMG to a gearbox of an engine of the aircraft.

8. The aircraft starting and generating system according to claim 1, wherein the first and second ICCs are housed in a first Line Replaceable Unit (LRU), and wherein an Engine Starter/Generator that includes the first and second starter main machine assemblies is housed in a second LRU.

9. The aircraft starting and generating system according to claim 1, wherein the PMG includes a stator having at least five windings, wherein three of the five windings are used for converter/regulator functions, wherein a fourth of the five windings is used for ICC power supply, and wherein a fifth of the five windings is used for excitation of the first and second exciters.

10. The aircraft starting and generating system according to claim 1, wherein each of the first and second ICCs includes generator voltage regulator assemblies (GVRs), wherein the GVRs rectify and modulate an output of the PMG.

11. The aircraft starting and generating system according to claim 1, wherein the gear train splits and steps up input mechanical power into two parallel paths, for providing the mechanical power simultaneously to the first and second starter/main machine assemblies.

12. The aircraft starting and generating system according to claim 1, further comprising an oil cooling system for providing cooling to the PMG, the first and second starter/main machine assemblies, and to the first and second ICCs.

13. The aircraft starting and generating system according to claim 12, further comprising:
an insulation system for providing an insulation function for the PMG, the first and second starter/main machine assemblies, and to the first and second ICCs,
wherein no cooling oil contacts the insulation system.

14. The aircraft starting and generating system according to claim 13, wherein the insulation system includes polymide materials and epoxy materials.

15. The aircraft starting and generating system according to claim 1, wherein the first and second exciters each comprises:
an exciter rotor; and
an exciter stator.

16. The aircraft starting and generating system according to claim 1, wherein the first and second starter/main machine assemblies each comprises:
a main machine rotor; and
a main machine stator.

17. An aircraft starting and generating system, comprising:
first starter/main machine assembly means for providing a start and a generate function for the aircraft;
second starter/main machine assembly means for providing a start and a generate function for the aircraft;
permanent magnet generator (PMG) means;
first ICC means for driving the first starter/main machine assembly means;
second ICC means for driving the second starter/main machine assembly means; and
speed increaser gear train means, wherein the first and second starter/main machine assembly means are connected in parallel to each other, and wherein the first and second start/main machine assembly means are connected to the speed increaser gear train means which is in turn connected to the PMG means,
wherein the first and second ICC means generate AC power to respectively drive the first and second starter/main machine assembly means in a start mode of the starting and generating system for starting a prime mover of the aircraft, and
wherein the first and second ICC means convert AC power, respectively obtained from the PMG means after the prime mover has been started, to DC power in a generate mode of the starting and generating system.

18. The aircraft starting and generating system according to claim 17, further comprising stub shaft means for coupling the PMG means to an engine gear box.

* * * * *